US009891479B2

(12) United States Patent
Uejima et al.

(10) Patent No.: US 9,891,479 B2
(45) Date of Patent: Feb. 13, 2018

(54) LIQUID CRYSTAL DISPLAY DEVICE INCLUDING A PIXEL ELECTRODE AND A COMMON ELECTRODE

(71) Applicant: Japan Display Inc., Minato-ku (JP)

(72) Inventors: Seiji Uejima, Tokyo (JP); Hidemasa Yamaguchi, Tokyo (JP); Yoshitaka Ozeki, Tokyo (JP); Takeyuki Tsuruma, Tokyo (JP); Kenta Seki, Tokyo (JP); Toshiaki Fukushima, Tokyo (JP)

(73) Assignee: Japan Display Inc., Minato-ku (JP)

( * ) Notice: Subject to any disclaimer, the term of this patent is extended or adjusted under 35 U.S.C. 154(b) by 43 days.

(21) Appl. No.: 14/602,604

(22) Filed: Jan. 22, 2015

(65) Prior Publication Data

US 2015/0212374 A1 Jul. 30, 2015

(30) Foreign Application Priority Data

Jan. 24, 2014 (JP) .................................. 2014-011190

(51) Int. Cl.
*G02F 1/1343* (2006.01)

(52) U.S. Cl.
CPC .................. *G02F 1/134309* (2013.01); *G02F 2001/134372* (2013.01)

(58) Field of Classification Search
CPC combination set(s) only.
See application file for complete search history.

(56) References Cited

U.S. PATENT DOCUMENTS 6,266,116 B1 * 7/2001 Ohta ................. G02F 1/134363
349/141
6,657,694 B2 * 12/2003 Ko .................... G02F 1/134363
349/141

(Continued)

FOREIGN PATENT DOCUMENTS

| CN | 1603915 A | 4/2005 |
| CN | 1818766 A | 8/2006 |

(Continued)

OTHER PUBLICATIONS

Combined Chinese Office Action and Search Report dated May 3, 2017 in Patent Application No. 201410746319.9 (with English Translation).

(Continued)

*Primary Examiner* — Lauren Nguyen
(74) *Attorney, Agent, or Firm* — Oblon, McClelland, Maier & Neustadt, L.L.P.

(57) ABSTRACT

According to one embodiment, a liquid crystal display device includes a first substrate, a second substrate, and a liquid crystal layer. The first substrate includes a first line, a second line, a switching element, a common electrode, an insulating film disposed on the common electrode, a pixel electrode connected with the switching element and opposed to the common electrode with the insulating film interposed therebetween, and a first alignment film covering the pixel electrode. The second substrate includes a second alignment film. And the pixel electrode includes one main pixel electrode extending in a belt shape in a pixel area defined by the first line and the second line.

16 Claims, 14 Drawing Sheets

(56) References Cited

U.S. PATENT DOCUMENTS

| | | | |
|---|---|---|---|
| 2003/0086045 A1* | 5/2003 | Ono | G02F 1/134309 349/141 |
| 2005/0264720 A1* | 12/2005 | Itou | G02F 1/133528 349/99 |
| 2006/0125991 A1 | 6/2006 | Lee | |
| 2007/0171319 A1 | 7/2007 | Fujita et al. | |
| 2011/0012821 A1* | 1/2011 | Ogura | G02F 1/133784 345/87 |
| 2012/0099070 A1* | 4/2012 | Hirosawa | G02F 1/134309 349/143 |
| 2013/0128176 A1 | 5/2013 | Hirosawa | |

FOREIGN PATENT DOCUMENTS

| | | |
|---|---|---|
| CN | 101038403 A | 9/2007 |
| CN | 102455557 A | 5/2012 |
| CN | 102608813 A | 7/2012 |
| CN | 103534642 A | 1/2014 |
| JP | 10-142635 A | 5/1998 |
| JP | 2002-296607 A | 10/2002 |
| JP | 2007-226200 | 9/2007 |
| JP | 2010-145871 A | 7/2010 |

OTHER PUBLICATIONS

Office Action dated Sep. 26, 2017, in Japanese Patent Application No. 2014-011190 (with English-language translation).

* cited by examiner

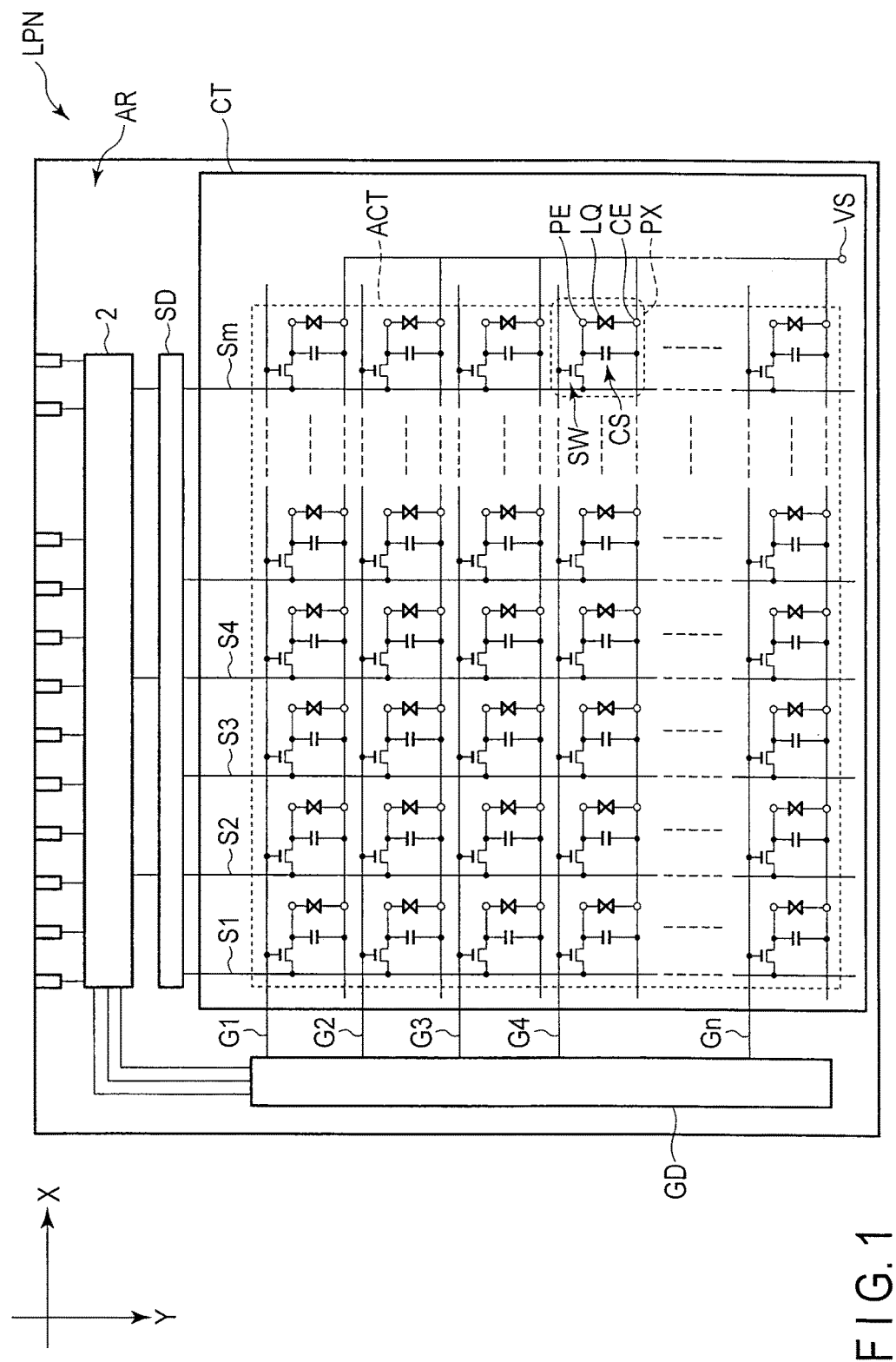
F I G. 1

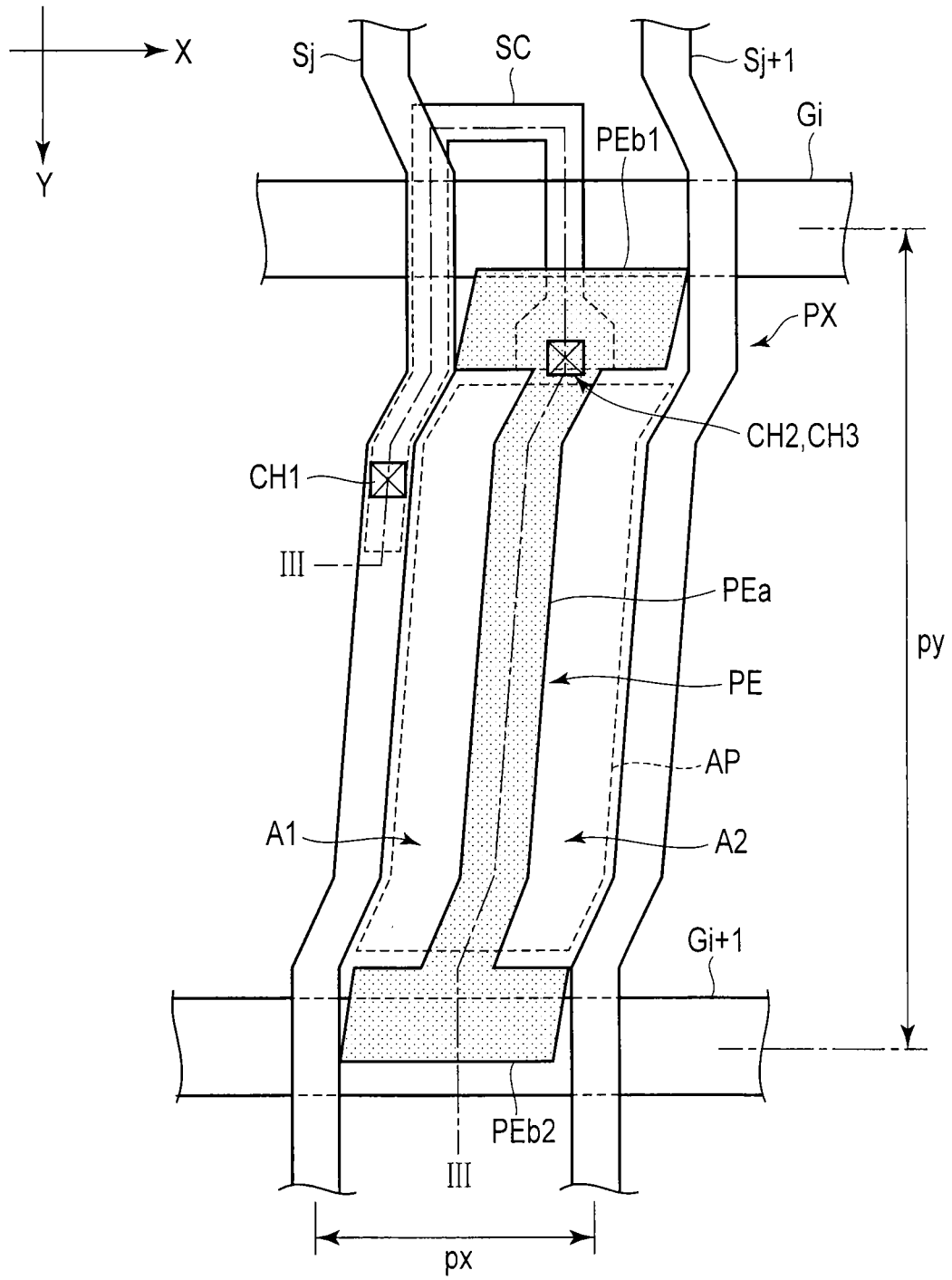
F I G. 2

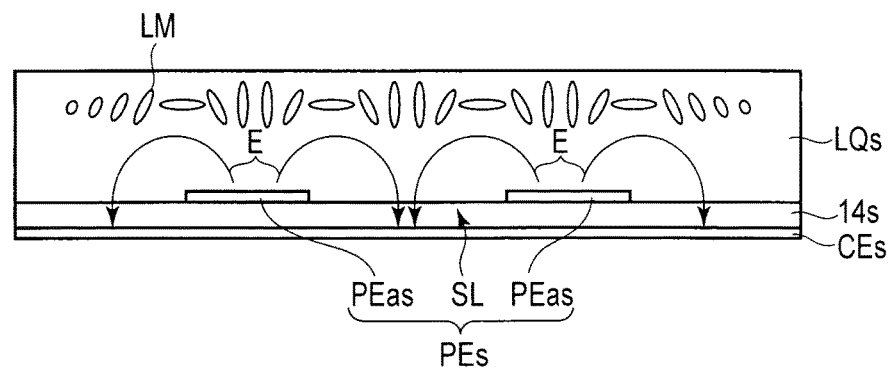
F I G. 7
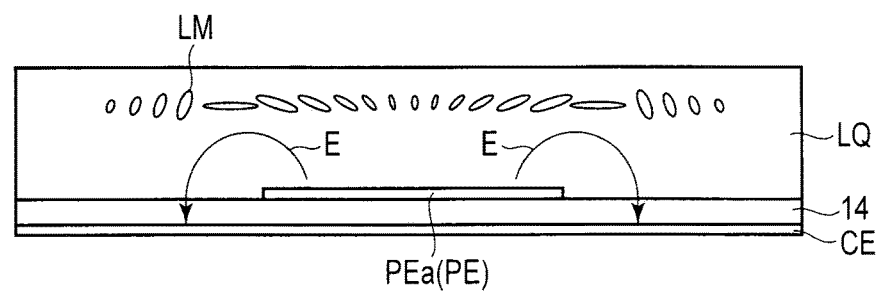
F I G. 8
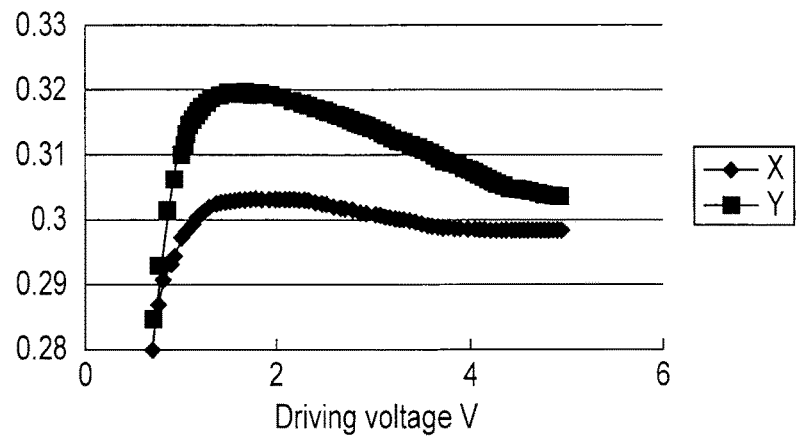
F I G. 9

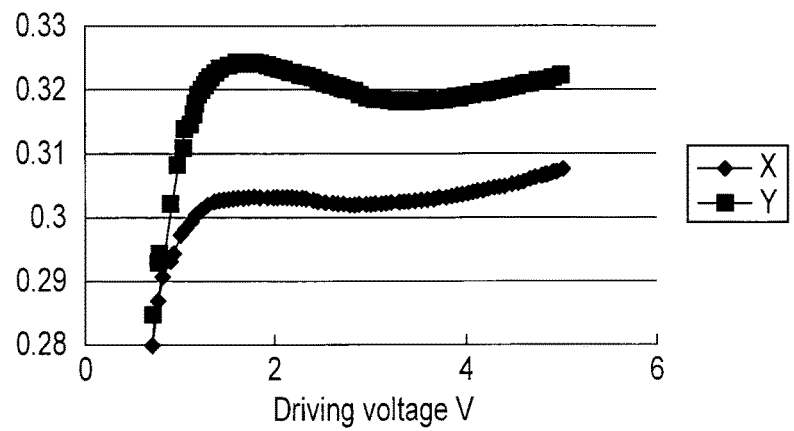
F I G. 10
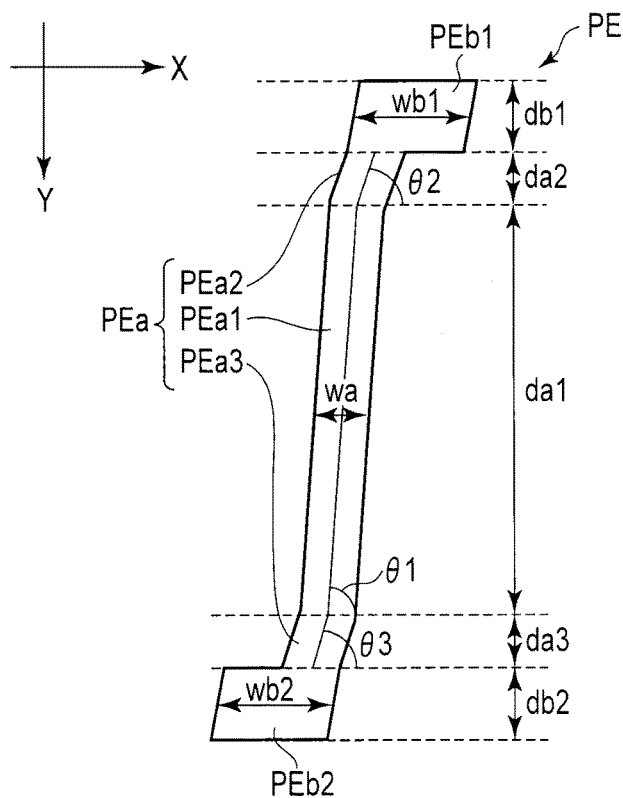
F I G. 11

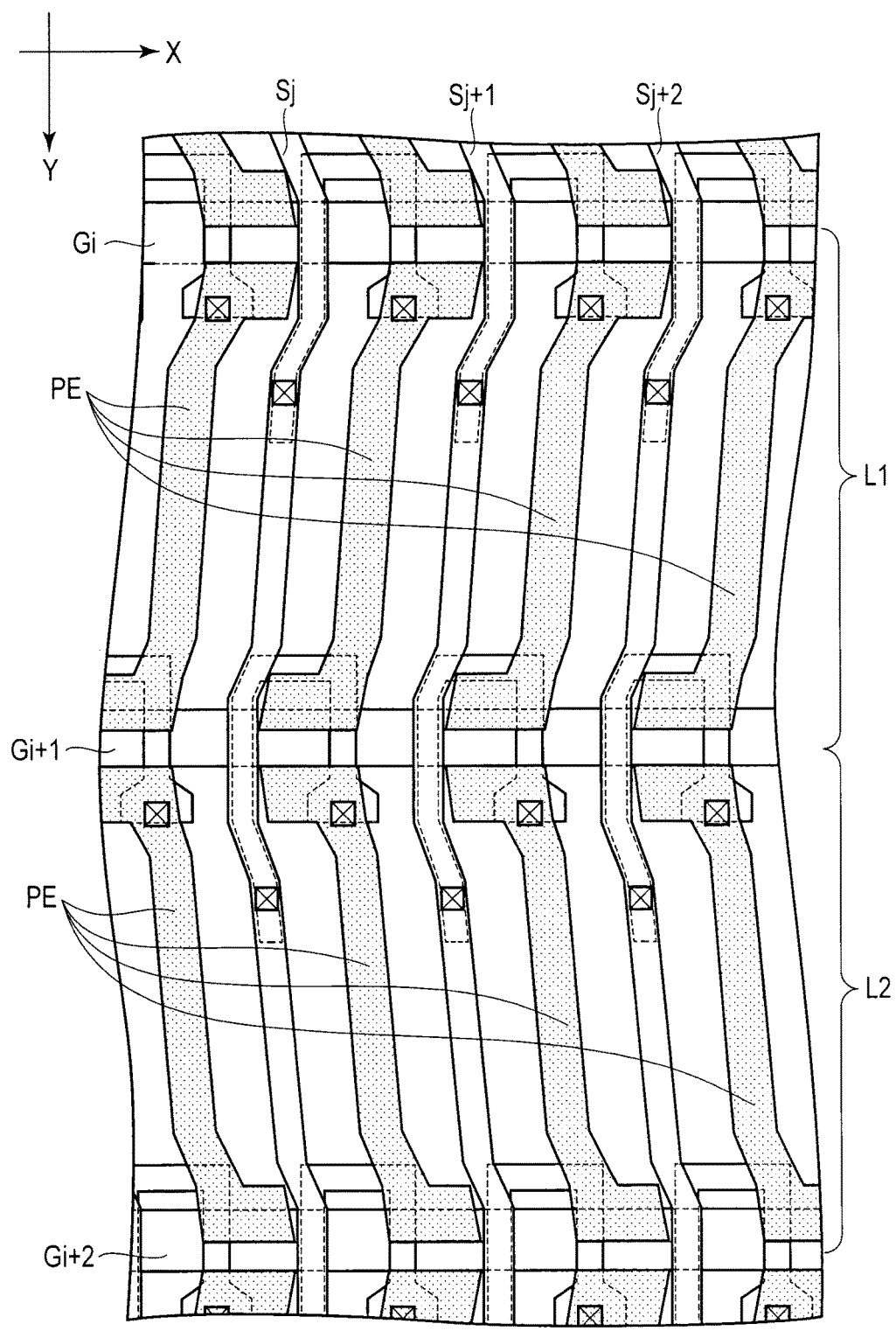
F I G. 12

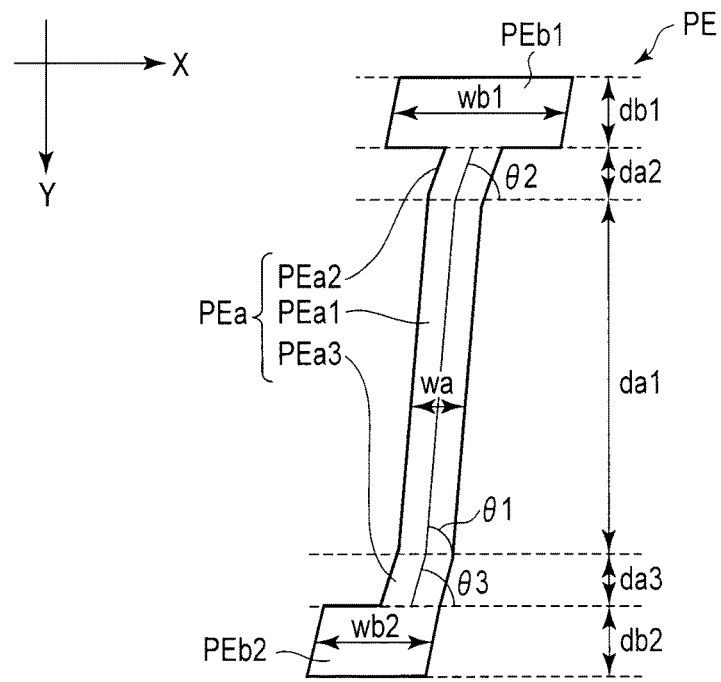
F I G. 15
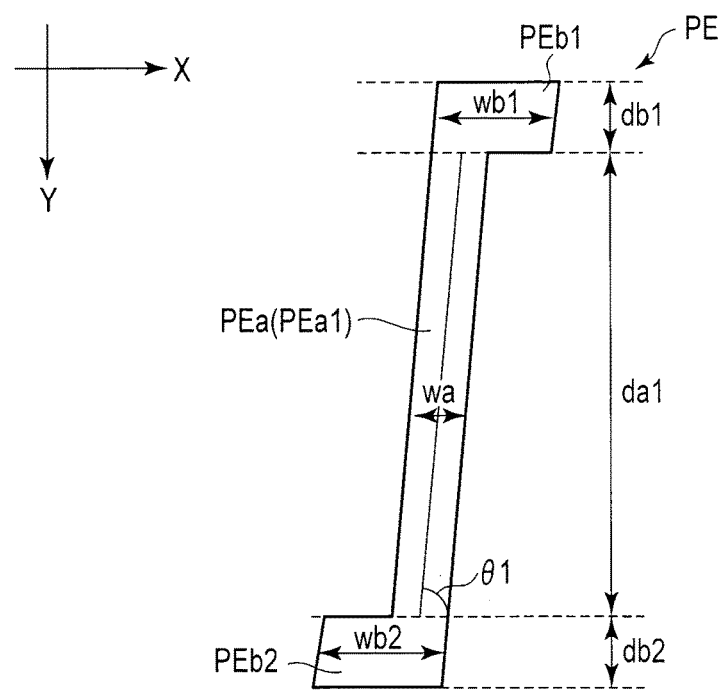
F I G. 16

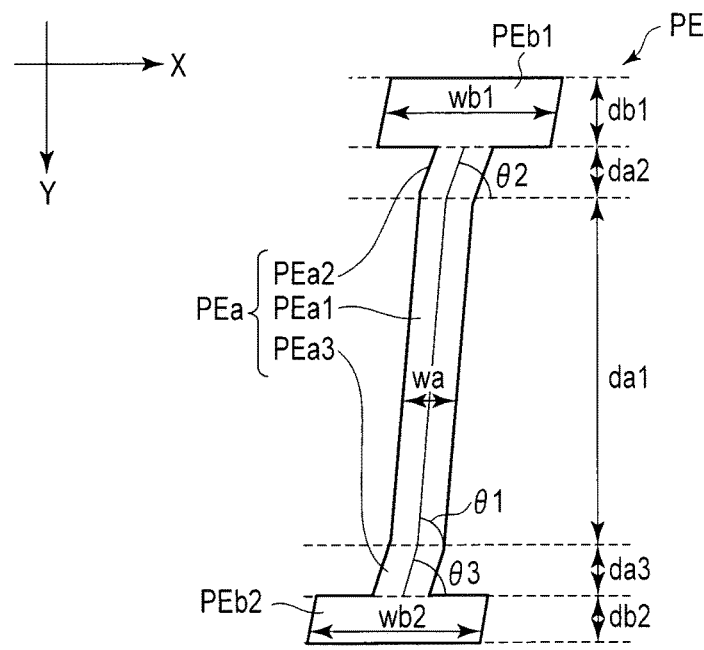
F I G. 17
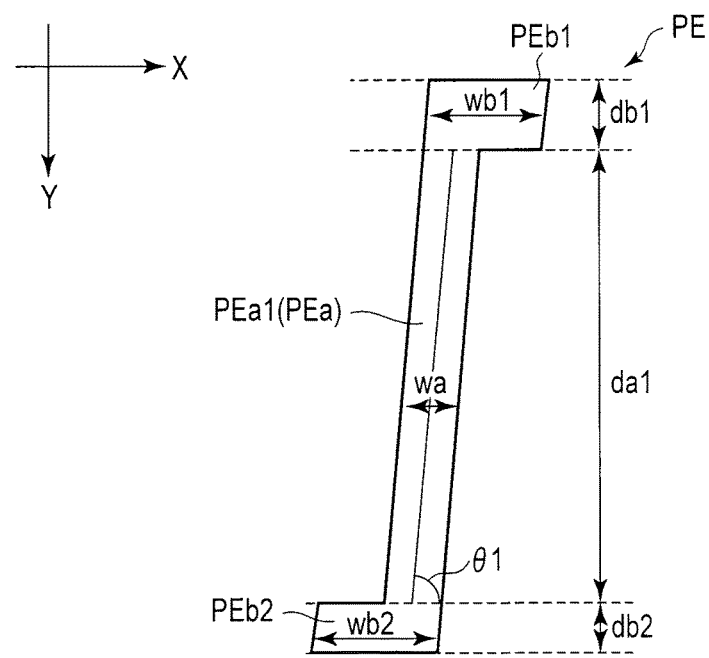
F I G. 18

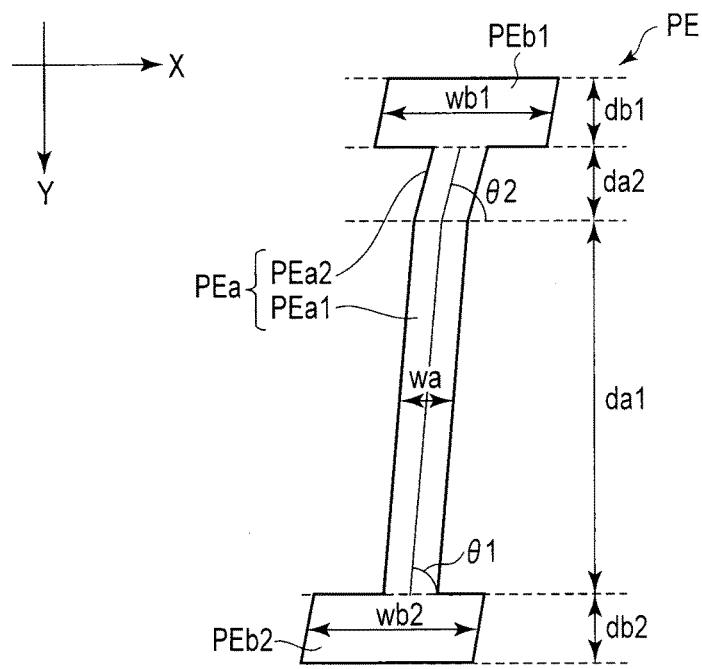
F I G. 19
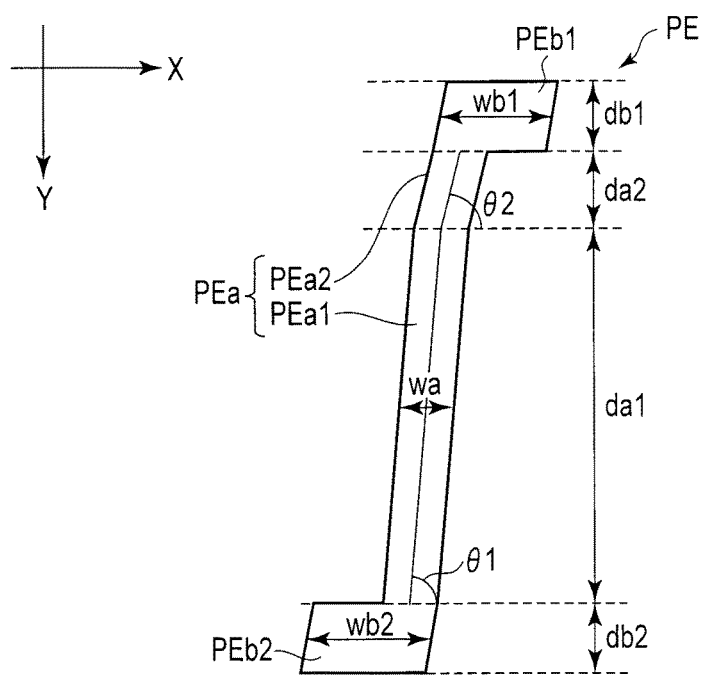
F I G. 20

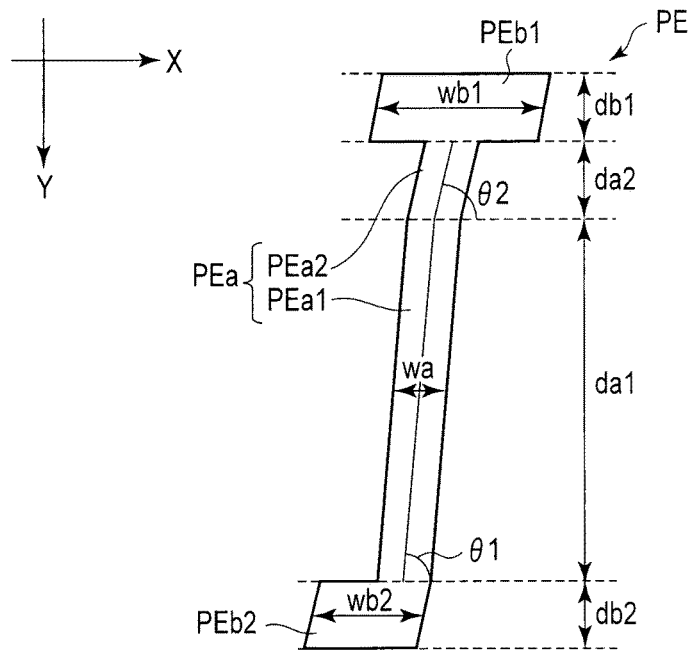
F I G. 21
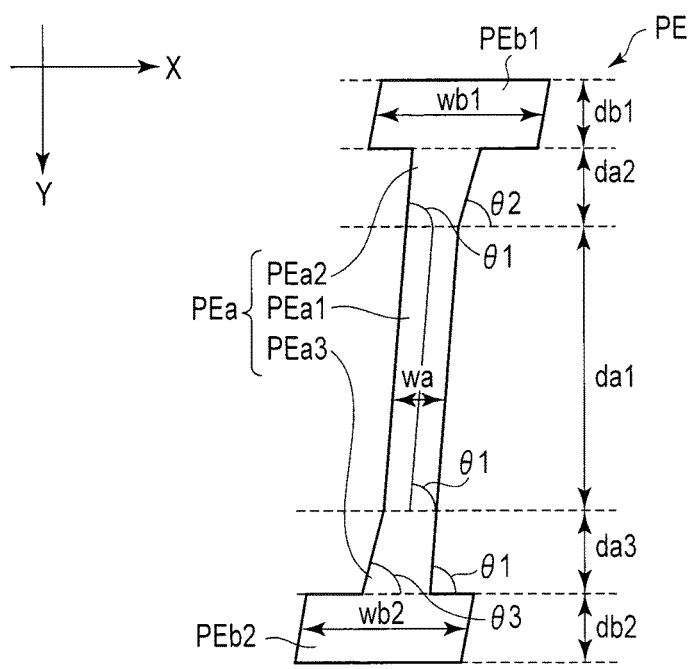
F I G. 22

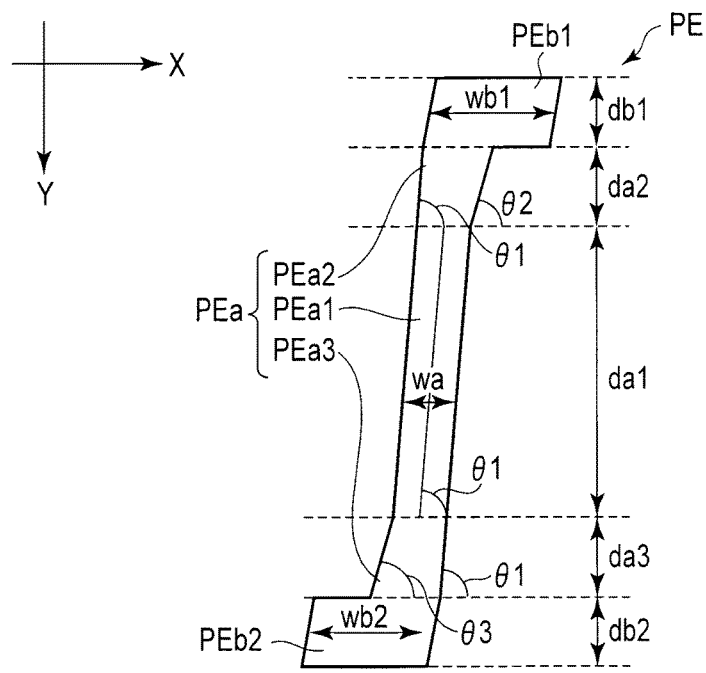
F I G. 23
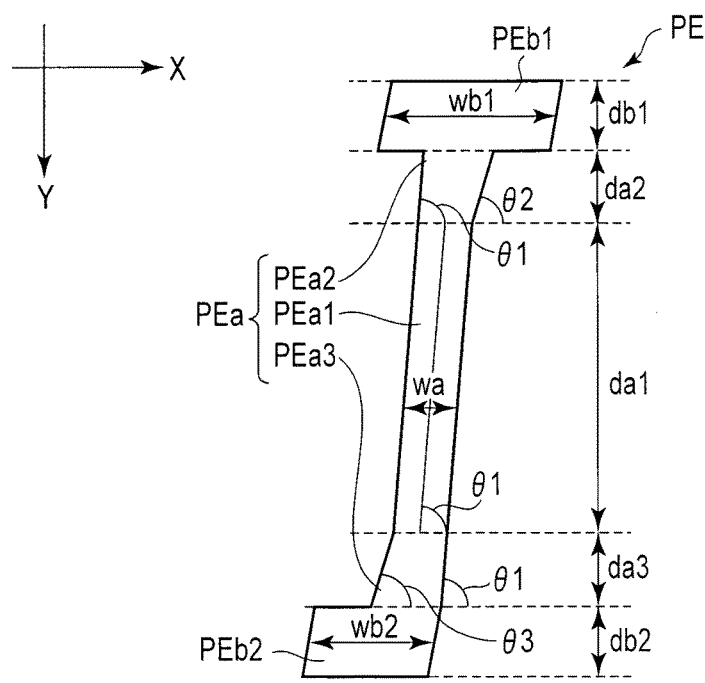
F I G. 24

LIQUID CRYSTAL DISPLAY DEVICE INCLUDING A PIXEL ELECTRODE AND A COMMON ELECTRODE

CROSS-REFERENCE TO RELATED APPLICATIONS

This application is based upon and claims the benefit of priority from Japanese Patent Application No. 2014-011190, filed Jan. 24, 2014, the entire contents of which are incorporated herein by reference.

FIELD

Embodiments described herein relate generally to a liquid crystal display device.

BACKGROUND

In recent years, development of flat-panel display devices is keen, and amongst others, a liquid crystal display device is a focus of attention because of their thin, light, and energy efficient advantages. Especially, developers' attention is being given to an active matrix type liquid crystal display device, in which a switching element is incorporated into each pixel, with a structure using a transverse electric field (including a fringe electric field) such as an in-plane switching (IPS) mode and a fringe field switching (FFS) mode. Such a liquid crystal display device in a transverse electric field mode includes pixel electrodes and counter electrodes formed on an array substrate and switches liquid crystal molecules using the transverse electric field which is substantially parallel to the main surface of the array substrate. In general, the IPS mode utilizes comb-tooth shaped pixel electrodes and the FFS mode utilizes pixel electrodes with slits.

Aside this trend, in recent years, high definition liquid crystal display devices are the great demand. To achieve the high definition liquid crystal display devices, structural elements of a pixel including the pixel electrode must be miniaturized. With a patterning process by a general exposure machine, however, the miniaturization of the comb-tooth shaped pixel electrodes and the pixel electrodes with slits now faces its process limit and will soon be powerless to achieve advanced high definition liquid crystal display devices.

BRIEF DESCRIPTION OF THE DRAWINGS

FIG. 1 schematically shows an equivalent circuit and structure of a liquid crystal display panel of a liquid crystal display device of one embodiment.

FIG. 2 is a schematic plan view which shows an example of the structure of a pixel in FIG. 1.

FIG. 7 is a schematic view which illustrates how a field generated between a pixel electrode with a slit and a common electrode influences liquid crystal molecules.

FIG. 8 is a schematic view which illustrates how a field generated between a pixel electrode of the embodiment and a common electrode influences liquid crystal molecules.

FIG. 9 is a graph which shows measurement results of a chromaticity corresponding to a driving voltage in a liquid crystal display panel including pixel electrodes each including a single slit.

FIG. 10 is a graph which shows measurement results of a chromaticity corresponding to a driving voltage in a liquid crystal display panel including the pixel electrodes of the embodiment.

FIG. 11 is a plan view which shows a pixel electrode of a first variation.

FIG. 12 is a schematic plan view which shows a plurality of pixels including the pixel electrodes of the first variation.

FIG. 15 is a plan view which shows a pixel electrode of a second variation.

FIG. 16 is a plan view which shows a pixel electrode of a third variation.

FIG. 17 is a plan view which shows a pixel electrode of a fourth variation.

FIG. 18 is a plan view which shows a pixel electrode of a fifth variation.

FIG. 19 is a plan view which shows a pixel electrode of a sixth variation.

FIG. 20 is a plan view which shows a pixel electrode of a seventh variation.

FIG. 21 is a plan view which shows a pixel electrode of an eighth variation.

FIG. 22 is a plan view which shows a pixel electrode of a ninth variation.

FIG. 23 is a plan view which shows a pixel electrode of a tenth variation.

FIG. 24 is a plan view which shows a pixel electrode of an eleventh variation.

DETAILED DESCRIPTION

Figure 3:
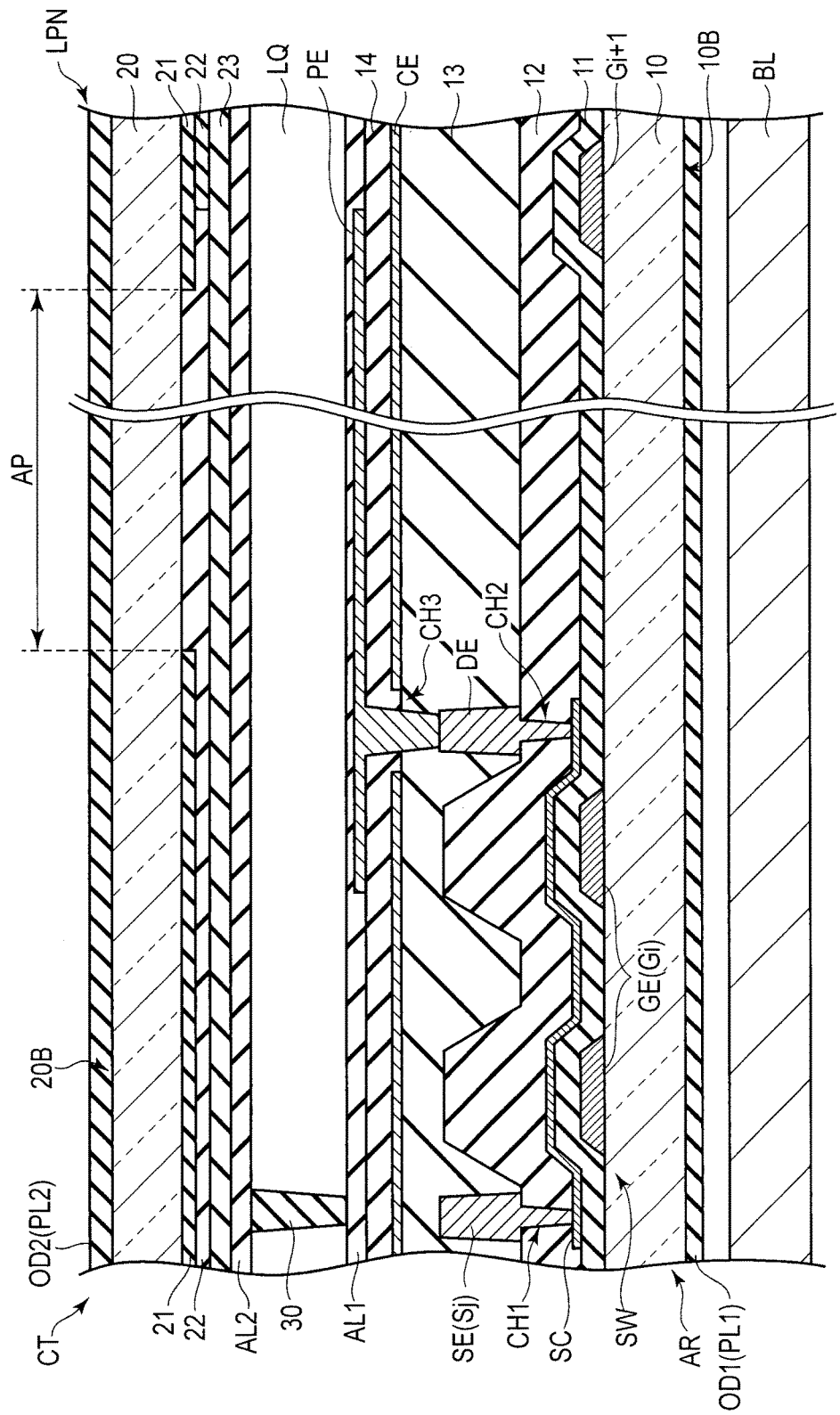
FIG. 3 is an example of the cross-sectional view along line III-III in FIG. 2.

In general, according to one embodiment, a liquid crystal display device includes a first substrate, a second substrate, and a liquid crystal layer. The first substrate includes a first line, a second line, a switching element electrically connected with the first line and the second line, a common electrode, an insulating film disposed on the common electrode, a pixel electrode electrically connected with the switching element and opposed to the common electrode with the insulating film interposed therebetween, and a first alignment film covering the pixel electrode. The second substrate includes a second alignment film. The liquid crystal layer includes liquid crystal molecules held between the first alignment film and the second alignment film. And the pixel electrode includes one main pixel electrode extending in a belt shape in a pixel area defined by the first line and the second line.

Hereinafter, embodiments are described with reference to the accompanying drawings.

Note that the disclosure herein is for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the Figures for the sake of simpler explanation as compared to actual embodiments, and they are not to limit the interpretation of the invention of the present application. Furthermore, in the description and Figures of the present application, structural elements having the same or similar functions will be referred to by the same reference numbers and detailed explanations of them that are considered redundant may be omitted.

FIG. 1 schematically shows an equivalent circuit and structure of a liquid crystal display panel LPN of a liquid crystal display device of one embodiment. The liquid crystal display device includes an active matrix type and transmissive type liquid crystal display panel LPN. The liquid crystal display panel LPN includes an array substrate AR which is utilized as a first substrate, a counter substrate CT opposed to the array substrate AR, which is utilized as a second substrate, and a liquid crystal layer LQ held between the array substrate AR and the counter substrate CT. The liquid crystal display panel LPN includes an active area ACT by which images are displayed. The active area ACT is composed of a plurality of pixels PX arranged in a matrix of m×n (m and n are positive integers).

In the active area ACT, the array substrate AR includes a plurality of gate lines G (G1 to Gn) each extending in direction X (first direction), a plurality of source lines S (S1 to Sm) each extending in direction Y (second direction) which is orthogonal to direction X, a switching element SW electrically connected with the gate line G and source line S in each pixel PX, a pixel electrode PE electrically connected with the switching element SW in each pixel PX, and includes a common electrode CE opposed to the pixel electrode PE.

The common electrode CE is shared with a plurality of pixels PX. The pixel electrode PE is formed in an island shape in each pixel PX. A pixel capacitance CS is, as described later, formed between the pixel electrode PE and the common electrode CE those are opposed to each other with an insulating film intervening therein.

Each gate line G is drawn outside the active area ACT and is connected with a gate driver GD. Each source line S is drawn outside the active area ACT and is connected with a source driver SD. The common electrode CE is electrically connected with a voltage supplier VS to which a common voltage is supplied. Gate driver GS and source driver SD are formed, at least partly, on the array substrate AR, for example, and are connected with a driving IC chip 2. In the example depicted, the driving IC chip 2 which is a signal source necessary for driving the liquid crystal display panel LPN is mounted on the array substrate AR outside the active area ACT of the liquid crystal display panel LPN.

Furthermore, in the example depicted, the liquid crystal display panel LPN is adoptable to the FFS mode, and includes pixel electrode PE and the common electrode CE on the array substrate AR. In such a liquid crystal display panel LPN, a transverse electric field formed between the pixel electrode PE and the common electrode CE (for example, an electric field which is substantially parallel to the substrate of the fringe electric field) is used mainly in order to switch the liquid crystal molecules of the liquid crystal layer LQ.

FIG. 2 is a schematic plan view which shows the structure of a pixel PX in the array substrate AR in FIG. 1, as being viewed from the counter substrate CT side. As shown in FIG. 2, source lines Sj and Sj+1 (j is a positive integer) each extending in direction Y are arranged in direction X with a first pitch px. Gate lines Gi and Gi+1 (i is a positive integer) each extending in direction X are arranged in direction Y with a second pitch py which is greater than the first pitch px. In the example depicted in FIG. 2, source line Sj is bent for a several times between gate line Gi and gate line Gi+1. The area defined by gate lines Gi and Gi+1 and source lines Sj and Sj+1 is a pixel area corresponding to a single pixel PX.

The array substrate AR includes a semiconductor layer SC. The semiconductor layer SC is formed of, for example, polysilicon, amorphous silicon, and oxide semiconductor. The semiconductor layer SC partly extends along source line Sj, crosses gate line Gi, and bends twice substantially vertically to again cross gate line Gi. The semiconductor layer SC structures a double gate type thin film transistor which functions as switching element SW in conjunction with gate line Gi and the like. Note that the switching element SW may not necessarily be a double gate type thin film transistor, and may be structured as other switching elements such as a single-gate thin film transistor.

The semiconductor layer SC is electrically connected with source line Sj through contact hole CH1. Furthermore, the semiconductor layer SC is electrically connected with the pixel electrode PE through contact holes CH2 and CH3.

FIG. 3 is a cross-sectional view along line III-III in FIG. 2. The cross-sectional view of FIG. 3 includes not only the array substrate AR but also other elements of the liquid crystal display panel LPN.

As shown in FIG. 3, the array substrate AR is formed of a light transmissive first insulating substrate 10 such as a glass substrate. The array substrate AR includes, at its side opposed to the counter substrate CT of the first insulating substrate 10, a switching element SW, common electrode CE, pixel electrode PE, first insulating film 11, second insulating film 12, third insulating film 13, fourth insulating film 14, and first alignment film AL1.

The switching element SW depicted here is, for example, a bottom gate type thin film transistor. The switching element SW may be of top gate type. A gate electrode GE of the switching element SW is disposed on the first insulating substrate 10. The gate electrode GE is a part of gate line Gi, for example. The gate electrode GE is covered with the first insulating film 11. Furthermore, the first insulating film 11 is disposed on the first insulating substrate 10.

The semiconductor layer SC is disposed on the first insulating film 11. The semiconductor layer SC is covered with the second insulating film 12. Furthermore, the second insulating film 12 is disposed on the first insulating film 11.

The switching element SW includes a source electrode SE and a drain electrode DE those are formed on the second insulating film 12. The source electrode SE is a part of source line Sj, for example. The source electrode SE contacts the semiconductor layer SC through contact hole CH1 which pierces through the second insulating film 12. The drain electrode DE contacts the semiconductor layer SC through contact hole CH2 which pierces through the second insulating film 12. The switching element SW with such a structure is, together with source lines Sj and Sj+1, covered with the third insulating film 13. The third insulating film 13 is disposed on the second insulating film 12. The third insulating film 13 is formed of a transparent resin material, for example.

The common electrode CE is formed on the third insulating film 13. The common electrode CE is formed on substantially the entirety of the active area excluding the area where the pixel electrode PE and the drain electrode DE are in contact. That is, the common electrode CE covers the area overlapping source lines Sj and Sj+1 and gate lines Gi and Gi+1. The common electrode CE is formed of a transparent conductive material such as indium tin oxide (ITO). When current is supplied, an electric field occurring in source lines Sj and Sj+1 and gate lines Gi and Gi+1 disposed at the first insulating substrate 10 side is shielded by the common electrode CE and hardly reaches the liquid crystal layer LQ.

The common electrode CE is covered with the fourth insulating film 14. The fourth insulating film 14 is disposed on the third insulating film 13. The fourth insulating film 14 functions as an interlayer insulating film between the common electrode CE and the pixel electrode PE and is formed thinner than the third insulating film 13 using, for example, a silicon nitride (SiNx) material.

Contact hole CH3 is pierced in the third insulating film 13 and the fourth insulating film 14 to reach the drain electrode DE. The common electrode CE has an opening which surrounds contact hole CH3.

The pixel electrode PE is formed on the fourth insulating film 14 and opposed to the common electrode CE. The pixel electrode PE is electrically connected with the drain electrode DE through contact hole CH3. The pixel electrode PE is formed of a transparent conductive material such as ITO.

The pixel electrode PE is covered with the first alignment film AL1 which also covers the fourth insulating film 14. The first alignment film AL1 is formed of a horizontal alignment material.

On the other hand, the counter substrate CT is formed of a light transmissive second insulating substrate 20 such as a glass substrate. The counter substrate CT includes, at its side opposed to the array substrate AR of the second insulating substrate 20, a black matrix 21, color filter 22, overcoat layer 23, and second alignment film AL2.

The black matrix 21 is opposed to the gate line G and source line S provided with the array substrate AR and, in addition, the interconnect part of the switching element SW and the like to define each pixel PX. The black matrix 21 functions as a light shielding layer which blocks the light from a backlight BL which leaks out of the proximity of the interconnect part and the external light which is incident upon the interconnect part. As depicted in FIGS. 2 and 3, the black matrix 21 defines an aperture AP in the pixel area.

The color filter 22 is formed on the aperture AP to extend over the black matrix 21. The color filter 22 is formed of a resin material of which color is different filter by filter using, for example, primal colors of red, blue, and green. Boundaries between color filters 22 of different colors are positioned to overlap a black matrix 21. The liquid crystal display panel LPN may include pixels PX which correspond to a color other than red, blue, and green, that is, white pixels PX, for example.

The overcoat layer 23 covers the color filter 22. Although FIG. 3 is depicted in a simplified manner, the surface of the color filter 22 at the array substrate AR side has asperity at its boundary to another color filter 22. The overcoat layer 23 flattens the asperity on the surface of the color filter 22. The overcoat layer 23 is formed of a transparent resin material.

The surface of the overcoat layer 23 is covered with the second alignment film AL2. The second alignment film AL2 is formed of a horizontal alignment material.

The above-described array substrate AR and the counter substrate CT are disposed in such a manner that the first alignment film AL1 and the second alignment film AL2 face each other. A predetermined cell gap is formed between the array substrate AR and the counter substrate CT by a columnar spacer 30 formed on one of these substrates. In the example depicted, the columnar spacer 30 is formed on the counter substrate CT; however, it may be formed on the array substrate AR. The array substrate AR and the counter substrate CT are attached by a sealing member with a cell gap therein. The liquid crystal layer LQ is constituted of a liquid crystal composition sealed within the cell gap between the first alignment film AL1 of the array substrate AR and the second alignment film AL2 of the counter substrate CT.

Backlight BL is disposed at a rear side of the liquid crystal display panel LPN structured as above. As a light source of the backlight BL, various models can be adopted including light-emitting diode (LED) and cold-cathode tube (CCFL).

First optical elements OD1 including a first polarizer PL1 is disposed on the outer surface of the array substrate AR, that is, on outer surface 10B of the first insulating substrate 10. Furthermore, second optical elements OD2 including a second polarizer PL2 is disposed on the outer surface of the counter substrate CT, that is, on outer surface 20B of the second insulating substrate 20. First polarization axis of the first polarizer PL1 and second polarization axis of the second polarizer PL2 are in a cross-Nicol positional relationship. Both the first optical elements OD1 and the second optical elements OD2 may further include a retardation film.

Surfaces of first alignment film AL1 and second alignment film AL2 those are parallel to the substrate main surface (or, X-Y plane) are subjected to an alignment treatment (for example, rubbing treatment and optical alignment treatment) performed in their respective parallel direction. For example, the direction of the alignment treatment of the first alignment film AL1 and the second alignment film AL2 is parallel to direction Y.

The first polarization axis of the first polarizer PL1 is set to be parallel to the direction of the alignment treatment of the first alignment film AL1 while the second polarization axis of the second polarizer PL2 is set to be orthogonal to the direction of the alignment treatment of the first alignment film AL1.

As shown in FIG. 2, the pixel electrode PE includes a single main pixel electrode PEa. The main pixel electrode PEa extends in a belt shape bending in parallel to source lines Sj and Sj+1 within the pixel area defined by gate lines Gi and Gi+1 and source lines Sj and Sj+1. The main pixel electrode PEa and the common electrode CE face each other with the fourth insulating film 14 intervening therebetween. That is, in the X-Y plane, the main pixel electrode PEa overlaps the common electrode CE excluding the area contacting the switching element SW. In the pixel area, there are provided non-counterareas A1 and A2 in which the main pixel electrode PEa and the common electrode CE do not face each other. More specifically, non-counterarea A1 is an area formed between the main pixel electrode PEa and source line Sj when the array substrate AR is viewed from the front of the counter substrate CT side. Furthermore, non-counterarea A2 is an area formed between the main pixel electrode PEa and source line Sj+1 when the array substrate AR is viewed from the front of the counter substrate CT side. In the FFS mode, liquid crystal molecules above each of non-counterareas A1 and A2 are switched suitably by the fringe field occurring between the main pixel electrode PEa and the common electrode CE, and high transmissivity can be obtained in the proximity of non-counterareas A1 and A2. That is, the light contributory to the display is mainly obtained in each of non-counterareas A1 and A2.

Furthermore, the pixel electrode PE includes a first auxiliary pixel electrode PEb1 and a second auxiliary pixel electrode PEb2 at the ends of the main pixel electrode PEa, respectively. Both auxiliary pixel electrodes PEb1 and PEb2 are arranged outside the aperture AP. That is, both auxiliary pixel electrodes PEb1 and PEb2 are opposed to the black matrix 21. The main pixel electrode PEa and auxiliary pixel electrodes PEb1 and PEb2 are opposed to the common electrode CE with the fourth insulating film 14 intervening therein, and they form a pixel capacitance CS which is necessary for driving a pixel PX therebetween. The main pixel electrode PEa and auxiliary pixel electrodes PEb1 and PEb2 are, for example, formed integrally with the same material through the same manufacturing process.

Pixels PX as shown in FIG. 2 are arranged on the array substrate AR in direction X and as a matrix.

Figure 4:
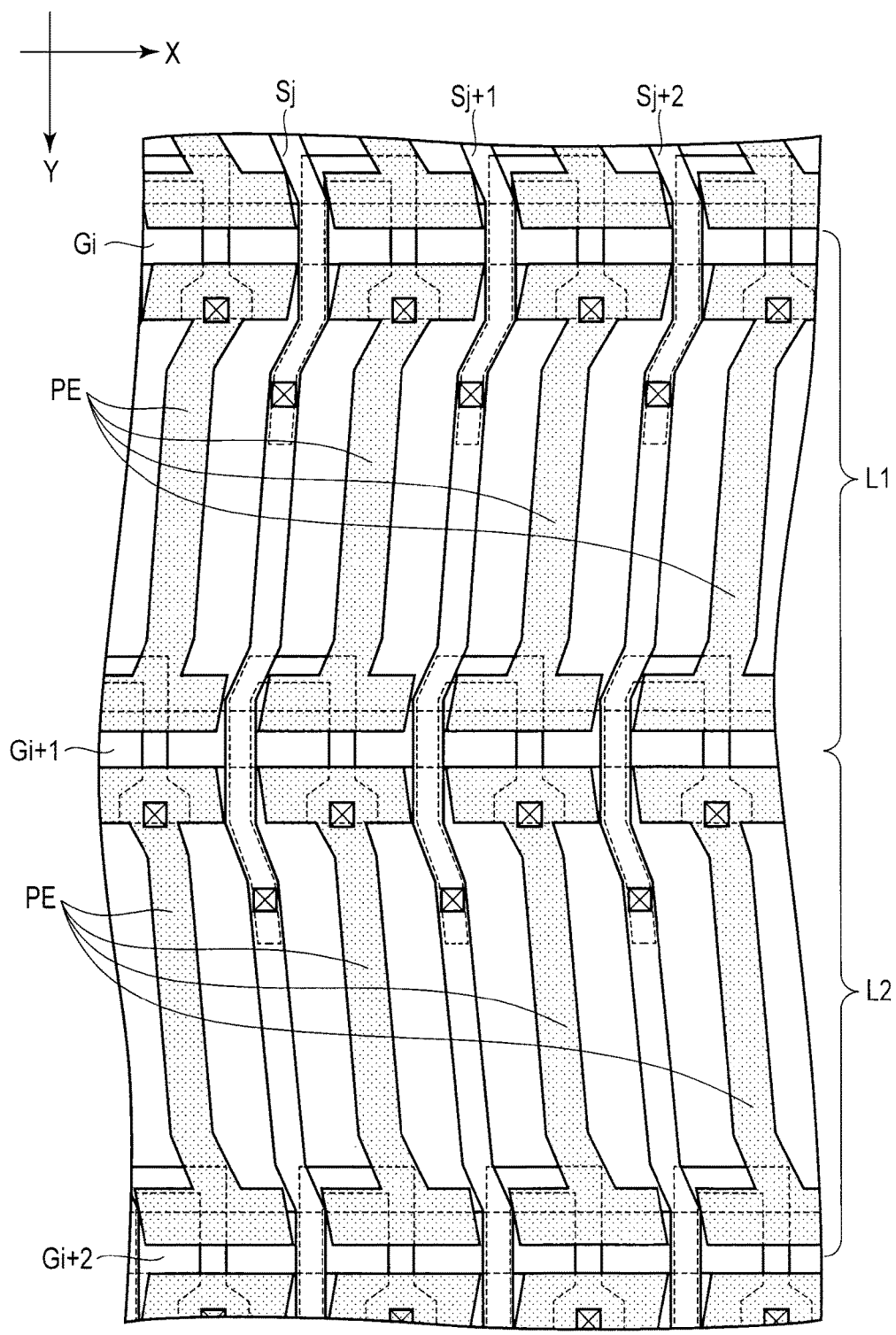
FIG. 4 is a schematic plan view which shows an example of a plurality of pixels formed on an array substrate of the embodiment.

FIG. 4 is a schematic plan view which shows a plurality of pixels PX formed on the array substrate AR as being viewed from the counter substrate CT side.

Pixels PX formed in first line L1 between gate lines Gi and Gi+1 are shaped as in FIG. 2. Pixels PX formed in second line L2 between gate lines Gi+1 and Gi+2 are shaped differently than the depiction in FIG. 2 mainly in respects of the shapes of the pixel electrode PE and the source line S. That is, comparing the pixel electrode PE and the source line S in second line L2 to those in first line L1, they are shaped symmetrically with respect to direction Y.

In such a manner, pixels PX shaped as in first line L1 and pixels PX shaped as in second line L2 are repeated in direction Y over the entirety of the active area ACT. For example, the shape as in first line L1 is adopted in the even-numbered lines and the shape as in second line L2 is adopted in the odd-numbered lines.

The members disposed from the display surface of the liquid crystal display panel LPN (the outer surface of the second optical device OD2) to the pixel electrode PE are transparent or highly transmissive. Therefore, the pixel electrodes PE arranged as in FIG. 4 can be observed through the display panel of a liquid crystal display device or a liquid crystal display panel LPN. When the liquid crystal display device and the liquid crystal display panel LPN are viewed from the front (the normal direction of the display surface), the exterior shape of the pixel electrodes PE is substantially rectangular. The thickness of the liquid crystal display device and the liquid crystal display panel LPN is sufficiently thin as compared to both the long side and the short side of this rectangle. That is, the liquid crystal display device and the liquid crystal display panel LPN are shaped as a flat panel.

For example, a pixel electrode PE including a main pixel electrode PEa and each of auxiliary pixel electrodes PEb1 and PEb2 have a width in direction X of 14 μm and a width in direction Y of 35 μm. The first pitch px and the second pitch py are 15 μm and 38 μm, respectively.

Now, operations of the above-structured liquid crystal display device are explained.

During an off period in which a voltage to form a potential difference between the pixel electrode PE and the common electrode CE is not being applied, there is no voltage applied to the liquid crystal layer LQ, and thus, there is no field formed between the pixel electrode PE and the common electrode CE. Hence, the liquid crystal molecules in the liquid crystal layer LQ are initially aligned in the direction of the alignment treatment of the first alignment film AL1 and the second alignment film AL2 within the X-Y plane. Hereinafter, the direction of the initial alignment of the liquid crystal molecules is referred to as an initial alignment direction.

During the off period, the backlight light from the backlight BL partly transmits the first polarizer PL1 and is incident upon the liquid crystal display panel LPN. The light incident upon the liquid crystal display panel LPN is linearly polarized light of which path is perpendicular to the first polarization axis of the first polarizer PL1. The polarization state of such linearly polarized light is substantially unchanged when it passes through the liquid crystal display panel LPN in the off period. Therefore, the linearly polarized light which has transmitted the liquid crystal display panel LPN is absorbed by the second polarizer PL2 which has a cross-Nicol positional relationship with respect to the first polarizer PL1 (black display).

On the other hand, during an on period in which the voltage to form a potential difference between the pixel electrode PE and the common electrode CE is being applied, there is a voltage applied to the liquid crystal layer LQ, and thus, there is a fringe field formed between the pixel electrode PE and the common electrode CE. Hence, the liquid crystal molecules are aligned in a direction different than the initial alignment direction within the X-Y plane.

During the on period, the linearly polarized light which is orthogonal to the first polarization axis of the first polarizer PL1 is incident upon the liquid crystal display panel LPN and is changed based on the alignment condition of the liquid crystal molecules LM (or the retardation of the liquid crystal layer) when it passes through the liquid crystal layer LQ. Therefore, during the on period, at least part of the light which has passed through the liquid crystal layer LQ transmits the second polarizer PL2 (white display).

Now, the shape of the pixel electrode PE is explained in detail.

Figure 5:
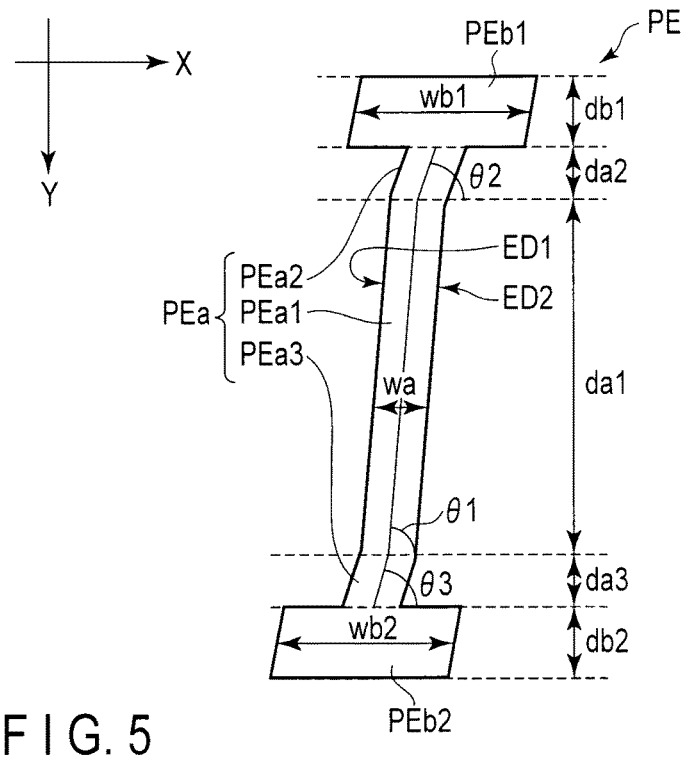
FIG. 5 is a plan view which shows an example of a pixel electrode of the embodiment.

FIG. 5 is a plan view which shows a pixel electrode PE as being viewed from the counter substrate CT side. This pixel electrode PE corresponds to that is formed in first line L1 in FIG. 4.

The main pixel electrode PEa of the pixel electrode PE includes first part PEa1, second part PEa2, and third part PEa3. The first part PEa1 extends in a belt shape at an angle θ1 counterclockwise with respect to direction X. The length of the first part PEa1 in direction Y is da1. The second part PEa2 extends in a belt shape at an angle θ2 counterclockwise with respect to direction X between the upper end of the first part PEa1 in FIG. 5 and the first auxiliary pixel electrode PEb1. The length of the second part PEa2 in direction Y is da2. The third part PEa3 extends in a belt shape at an angle θ3 counterclockwise with respect to direction X between the lower end of the first part PEa1 in FIG. 5 and the second auxiliary pixel electrode PEb2. The length of the third part PEa3 in direction Y is da3.

In the present embodiment, angles θ1 to θ3 are acute angles and angles θ2 and θ3 are the same angle (θ2=θ3). Furthermore, in the present embodiment, lengths da2 and da3 are the same length (da2=da3), and are less than the length da1.

The width of the main pixel electrode PEa in direction X is wa which is a constant in each of parts PEa1 to PEa3. The width of the first auxiliary pixel electrode PEb1 in direction X is wb1 and the width of the second auxiliary pixel electrode PEb2 in direction X is wb2.

The pixel electrode PE of the present embodiment is not formed with a slit unlike other general pixel electrodes used in a FFS mode. That is, a single pixel electrode PE includes only a single main pixel electrode PEa to form a fringe field which is necessary for the display between itself and the common electrode CE. From a different standpoint, the pixel electrode PE includes the main pixel electrode PEa having only two edges ED1 and ED2 extending in parallel in the pixel area. The main pixel electrode PEa dos not include any other edge between edges ED1 and ED2. Edges ED1 and ED2 extend bending counterclockwise in the direction of angles θ1 to θ3 with respect to direction X. From another standpoint, the pixel electrode PE extends in a belt shape bending counterclockwise in the direction of angles θ1 to θ3 with respect to direction X over the entire length of the main pixel electrode PEa with a continued cross-sectional shape which does not have a discontinuous part therein. The cross-sectional shape here means, for example, a cross-sectional shape along the width direction (direction X). In a case where the width wa is constant over the entire length of the main pixel electrode PEa, the cross-sectional shape is uniform over the entire length of the main pixel electrode PEa.

The first auxiliary pixel electrode PEb1 extends in direction X and, at its middle part, connects with the end of the main pixel electrode PEa (the end at the second part PEa2 side). That is, the first auxiliary pixel electrode PEb1 and the second part PEa2 form substantially a T-shape. The second auxiliary pixel electrode PEb2 extends in direction X and, at its middle part, connects with the end of the main pixel electrode PEa (the end at the second part PEa3). That is, the second auxiliary pixel electrode PEb2 and the third part PEa3 form substantially a T-shape. In the present embodiment, auxiliary pixel electrodes PEb1 and PEb2 have the same shape. That is, the width wb1 of the auxiliary pixel electrode PEb1 and the width wb2 of the auxiliary pixel electrode PEb2 in direction X are the same (wb1=wb2). Furthermore, the length db1 of the auxiliary pixel electrode PEb1 and the length db2 of the auxiliary pixel electrode PEb2 in direction Y are the same (db1=db2).

Each of widths wb1 and wb2 of auxiliary pixel electrodes PEb1 and PEb2 is greater than the width wa of the main pixel electrode PEa (wa<wb1, wb2). With these enlarged widths wb1 and wb2 of auxiliary pixel electrodes PEb1 and PEb2, a pixel capacitance CS formed between them and the common electrode CE can be sufficient. Note that each of auxiliary pixel electrodes PEb1 and PEb2 is disposed to be opposed to the black matrix 21, and thus, even if they are enlarged in size, there will be no loss in the transmissivity in the aperture AP.

In a case where a touchpanel is provided with a liquid crystal display device, when a user's finger or a stylus is pressed against the liquid crystal display panel LPN, the pressure applied thereon may expand a domain of the liquid crystal layer LQ and an effect caused by the pressure may reside even after the finger or the stylus is off the panel. Such an effect may be referred to as touch tailing or the like. In the structure of the present embodiment, the main pixel electrode PEa is bent several times, and such a structure can have a stronger alignment of liquid crystal molecules during the on period as compared to a case where the main pixel electrode PEa is shaped straight without a bend, for example. That is, comparing a fringe field generated between the second part PEa2 and third part PEa3 of the main pixel electrode PEa and the common electrode CE to a fringe field generated between the first part PEa1 and the common electrode CE, the former one is stronger than the latter one in respect of the rotation force of the liquid crystal molecules. Therefore, when the pressure force is released, the liquid crystal molecules can be directed to a desired alignment direction by the function of the fringe field generated in the proximity of the second part PEa2 and the third part PEa3, and a possibility of disclination (alignment defect) such as touch tailing mentioned above can be suppressed.

The applicant performed experiments and simulations which proved that angles θ1 to θ3 and lengths d1 and d3 satisfying the following conditions: 45°≤θ2 and θ3≤75°, 75°≤θ1≤87°, θ2 and θ3≤θ1, 3 μm≤da2, and da3≤10 μm exhibited a good suppression effect of disclination. Therefore, the shape of the main pixel electrode PEa should preferably be determined to satisfy the above conditions.

The width wa of the main pixel electrode PEa must be set in such a manner that, when the display surface of the liquid crystal display panel LPN is viewed from a slanted angle (is viewed from a slanting direction with respect to the normal direction of the display surface), colors of adjacent pixels PX do not blend exceedingly. Furthermore, the width wa of the main pixel electrode PEa must be set in such a manner that the pixel capacitance CS formed between the pixel electrode PE and the common electrode CE can have a sufficient value.

Figure 6:
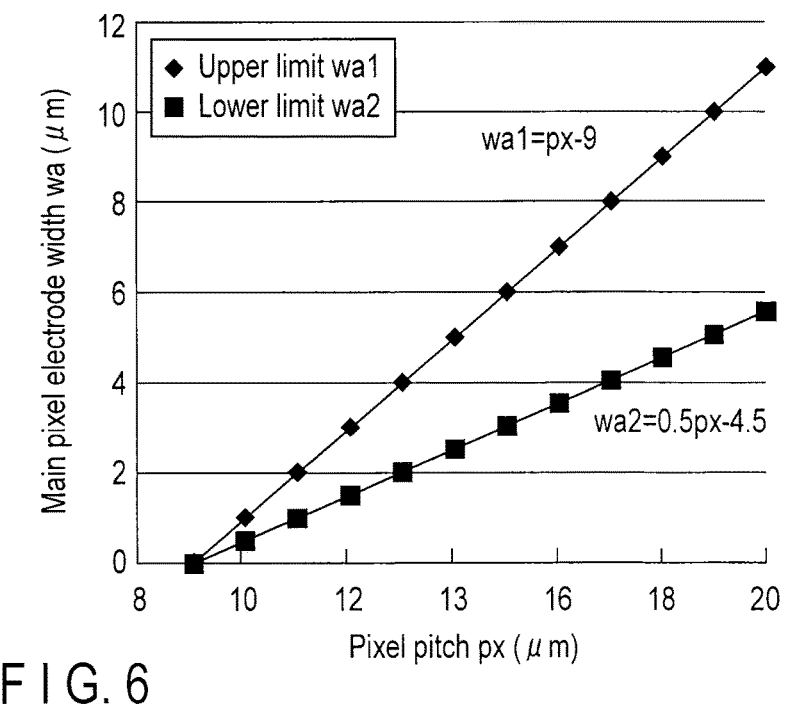
FIG. 6 is a graph which shows measurement results of an upper limit and a lower limit adoptable in a width of a main pixel electrode of the embodiment.

From these standpoints, the applicant measured the upper limit wa1 and the lower limit wa2 those were applicable as the width wa of the main pixel electrode PEa in a pitch by pitch basis as to the pitches (first pitch px) of the pixel electrodes PE arranged in direction X. FIG. 6 is a graph which shows the measurement results.

To prevent an excessive color blend in adjacent pixels, the distance between one main pixel electrode PEa and other pixel electrodes PEa in adjacent pixels PX must be set to be as great as possible. The upper limit wa1 was thus measured considering this point. As a result of this measurement, it was acknowledged that the upper limit wa1 could be defined by an approximation straight line of wa1=px−9 μm.

To form a sufficient pixel capacitance CS, the width wa of a main pixel electrode PEa must be set as large as possible. The lower limit wa2 was thus measured considering this point. The film thickness of the fourth insulating film 14 was estimated to be approximately 80 to 120 nm. As a result of this measurement, it was acknowledged that the lower limit wa2 could be defined by an approximation straight line of wa2=0.5px−4.5 μm.

From the above, the width wa of the main pixel electrode PEa should preferably be set to satisfy the following.

$$0.5px-4.5 \text{ μm} \leq wa \leq px-9 \text{ μm}$$

Now, an advantage of the liquid crystal display device of the present embodiment over a liquid crystal display device with a pixel electrode having a slit generally used in the FFS mode.

When a pixel electrode is manufactured through a general manufacturing process, a line width or a slit width of 2 to 3 μm is its limit of resolution. Furthermore, as mentioned above, to prevent an excessive color blend in adjacent pixels PX, the distance between one main pixel electrode PEa and other pixel electrodes PEa in adjacent pixels PX must be set to be sufficiently great.

Here, given that a formable minimum width of a pixel electrode is 3 μm and a gap between adjacent pixels PX in direction X requires at least 11 μm, the minimum width of a pixel PX including, for example, a pixel electrode with a single slit will be obtained as follows. The sum of two electrode parts partitioned by a slit and the width of the slit in direction X is 9 μm and a gap between two pixels PX is 11 μm, and thus, their sum total of 20 μm (423 ppi) is the minimum width of a pixel PX.

In contrast, the minimum width of a pixel PX in the present embodiment will be, even when the width wa of the pixel electrode PE is set to 4 to 5 μm which is relatively larger than the limit of resolution (for example, 3 μm) in a general manufacturing process, 15 to 16 μm. That is, adding the width wa of 4 to 5 μm to the gap between two pixels of 11 μm makes the minimum width of 15 to 16 μm in the present embodiment. Therefore, the pixel electrode PE described in the present embodiment can significantly miniaturize the size of a pixel PX as compared to a pixel electrode with a slit. Using such miniaturized pixels PX, there can be achieved a super high definition liquid crystal display device with image resolution of, for example, 500 ppi or more which is superior to a conventional FFS mode liquid crystal display device.

Furthermore, as to such a conventional FFS mode liquid crystal display device using a pixel electrode with a slit, there has been a problem that a shift in a display color often occurred corresponding to a change in a driving voltage V of a pixel electrode. Now, this problem is explained.

FIG. 7 shows how liquid crystal molecules are influenced by a field generated between a pixel electrode with a slit and a common electrode. FIG. 7 is a cross-sectional view which schematically shows a common electrode CEs, pixel electrode PEs with a slit, fourth insulating film 14s and liquid crystal layer LQs. The pixel electrode PEs includes a single slit SL and two main pixel electrodes PEa divided by the slit SL. The common electrode CEs, fourth insulating film 14s, and liquid crystal layer LQs correspond to the above-mentioned common electrode CE, fourth insulating film 14, and liquid crystal layer LQ, respectively. Liquid crystal molecules LM in the liquid crystal layer LQs are initially aligned in such a manner that their major axes go toward the initial alignment direction which is set within a plane parallel to the main surface of an array substrate.

When a driving voltage V is applied to the pixel electrode PEs, a fringe field E is generated from each of the main pixel electrode PEa to the common electrode CEs. The liquid crystal molecules LM rotate in such a manner that their major axes face the direction of the fringe field E. At that time, the liquid crystal molecules LM above the proximity of the middle part of each of each main pixel electrode PEa are influenced by the fringe field E which goes over both edges of each main pixel electrode PEa to the common electrode CE, and they rise vertically or near vertically with respect to the main surface of the array substrate. Furthermore, the liquid crystal molecules LM above the proximity of the middle part of the slit SL are influenced by the fringe field E which goes from each main pixel electrode PEa to the common electrode CE below the slit SL, and they rise vertically or near vertically with respect to the main surface of the array substrate. Within the plane parallel to the main surface of the array substrate, the rise of the liquid crystal molecules LM changes according to the driving voltage V which is applied to the pixel electrode PEs. This causes a shift in a display color as mentioned above.

In comparison with the case in FIG. 7, a relationship between a fringe field E and liquid crystal molecules LM in a case where the pixel electrode PE of the present embodiment is explained. FIG. 8 shows how liquid crystal molecules are influenced by a field generated between a pixel electrode PE and a common electrode CE. FIG. 8 is a cross-sectional view which schematically shows the common electrode CE, pixel electrode PE, fourth insulating film 14 and liquid crystal layer LQ.

In the example depicted in FIG. 8, the width wa of the main pixel electrode PEa is greater than the width of each main pixel electrode PEa in FIG. 7 but less than the sum of both the main pixel electrodes PEa and the slit SL in FIG. 7. Since the width wa of the main pixel electrode PEa is greater than that of each main pixel electrode PEa, the liquid crystal molecules LM above the proximity of the middle part of the main pixel electrode PEa are not so much influenced by the fringe field E which goes over both edges of each main pixel electrode PEa to the common electrode CE. Therefore, the liquid crystal molecules LM above the proximity of middle part of the main pixel electrode PEa do not easily rise in the direction orthogonal to the main surface of the array substrate AR.

If the width wa of the main pixel electrode PEa is reduced to the size of one of the main pixel electrodes PEa in the example depicted in FIG. 7, the liquid crystal molecules LM above the proximity of the middle part of the main pixel electrode PEa could rise up. However, even in that case, the liquid crystal molecules LM above the slit SL in FIG. 7 do not rise. Thus, the area in which the liquid crystal molecules LM rise can be suppressed greater by using the pixel electrode PE as compared to a case where the pixel electrode PEs is used.

FIG. 9 is a graph which shows measurement results of chromaticity corresponding to driving voltage V measured in a white color display by a liquid crystal display panel including pixel electrodes PEs each having a single slit. FIG. 10 is a graph which shows measurement results of chromaticity corresponding to driving voltage V measured in a white color display by a liquid crystal display panel including pixel electrodes PE of the present embodiment. The measurements were performed under the same conditions except for the shape of the pixel electrode.

In FIGS. 9 and 10, the two plotted lines represent value x and value y, respectively, in the CIE colorimetric system measured at each driving voltage V. In FIG. 9, both the values x and y reach their peaks at the driving voltage of 1.8 V and then gradually decrease in accordance with the rise in the driving voltage V. Especially, the value y changes greatly, and thus, the shift in a display color is remarkable.

In FIG. 10, both the values x and y reach their peaks at the driving voltage of 1.8 V as in FIG. 9. Then, the values x and y decrease in accordance with the rise in the driving voltage V with a gentle slope as compared with the case of FIG. 9 and then rise up again. As can be understood from the measurement results of the values x and y in FIGS. 9 and 10, the chromaticity change in accordance with the change in the driving voltage V can be suppressed greater with the pixel electrode PE without a slit than with the pixel electrode PEs with a slit. That is, a liquid crystal display device which shows a less shift in a display color due to the change in driving voltage V can be achieved using the pixel electrode PE of the present embodiment.

Furthermore, the pixel electrode PE of the present embodiment includes the first and second auxiliary pixel electrodes PEb1 and PEb2. Auxiliary pixel electrodes PEb1 and PEb2 increase the pixel capacitance CS formed by the pixel electrode PE, common electrode CE, and fourth insulating film 14. Since the pixel capacitance CS is fully increased, there is no need to provide an additional auxiliary capacitance with each pixel PX. In that case, an auxiliary capacitance line and the like can be omitted from the structure, and thus, the transmissivity can be improved.

Furthermore, in the pixel electrode PE of the present embodiment, the main pixel electrode PEa includes the first to third parts PEa1 to PEa3 slanting at angles θ1 to θ3, respectively, with respect to direction X. With the main pixel electrode PEa bent in such a manner, the aforementioned disclination can be reduced or prevented.

Aside from the above advantages, various other suitable advantages can be achieved from the structure of the present embodiment.

The structure of the present embodiment as described above can be achieved in suitably modified forms.

That is, for example, the shape of the pixel electrode PE is not limited to those explained with reference to FIGS. 2, 4 and 5. Hereinafter, some variations of the shape of the pixel electrode PE are described.

(First Variation)

FIG. 11 is a plan view which shows a pixel electrode PE of the first variation as being viewed from the counter substrate CT side. Comparing the pixel electrode PE of the first variation to that of FIG. 5, the first variation shows that the end of the first auxiliary pixel electrode PEb1 connects with the end of the main pixel electrode PEa (the end at the second part PEa2 side) and the end of the second auxiliary pixel electrode PEb2 connects with the other end of the main pixel electrode PEa (the end at the third part PEa3 side). The pixel electrode PE of the first variation differs from that of FIG. 5 in these respects. That is, the first auxiliary pixel electrode PEb1 and the second part PEa2, and the second auxiliary pixel electrode PEb2 and the third part PEa3 form substantially an L-shape, respectively.

FIG. 12 is a schematic plan view which shows a plurality of pixels PX including pixel electrodes PE of the first variation as being viewed from the counter substrate CT side. Pixels PX formed in first line L1 between gate lines Gi and Gi+1 each include the pixel electrode PE shown in FIG. 11. Pixels PX formed in second line L2 between gate lines Gi+1 and Gi+2 each include the pixel electrode PE shaped differently than that in first line L1 mainly in respects of the shapes of the pixel electrode PE and the source line S. That is, comparing the pixel electrode PE and the source line S in second line L2 to those in first line L1, they are shaped symmetrically with respect to direction Y.

A liquid crystal display device using the pixel electrodes PE of the first variation can exhibit excellent optical transmissivity as compared to a liquid crystal display device using the pixel electrodes PE of the above embodiment. This effect is explained with reference to FIGS. 13 and 14.

Figure 13:
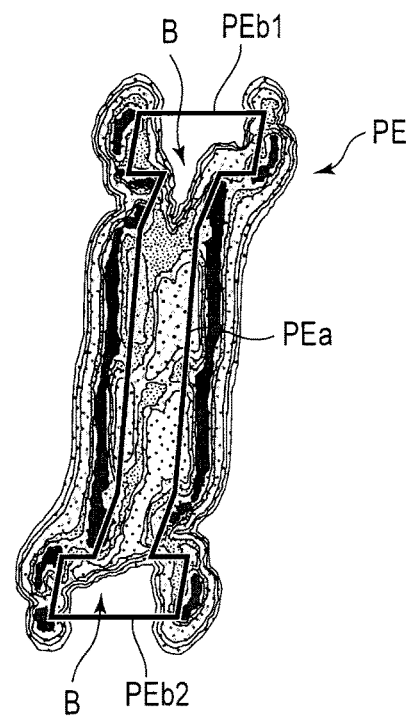
FIG. 13 is a transmissivity distribution map which shows results of optical transmissivity measurement in the pixels of the pixel electrodes of the embodiment.
Figure 14:
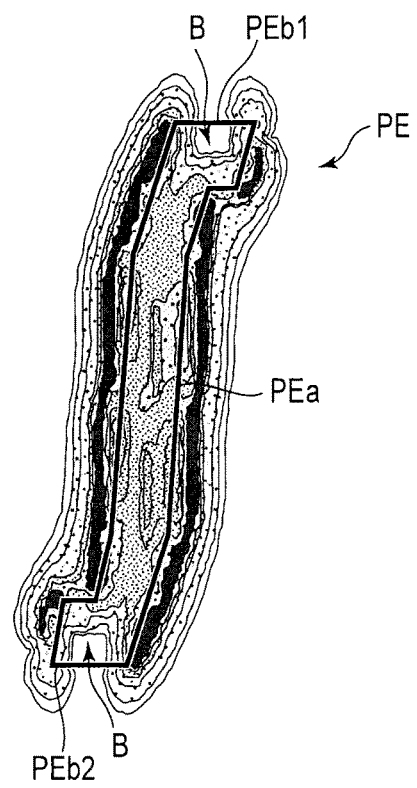
FIG. 14 is a transmissivity distribution map which shows results of optical transmissivity measurement in the pixels of the pixel electrodes of the first variation.

FIG. 13 is a transmissivity distribution map which shows the optical transmissivity measured in the pixel PX using the pixel electrode PE of the above embodiment. FIG. 14 is a transmissivity distribution map which shows the optical transmissivity measured in the pixel PX using the pixel electrode PE of the first variation. In these Figures, the distribution of the optical transmissivity is depicted by using shades of gray and isopleths. The darker part represents higher transmissivity.

As can be understood form the measurement results of FIGS. 13 and 14, the transmissivity becomes highest at the proximity of the edges of the main pixel electrode PEa in each case. In the measurement result of FIG. 13, there were recognized low transmissivity areas B showing at the proximity of the middle of each of auxiliary pixel electrodes PEb1 and PEb2 and extending along the main pixel electrode PEa. These low transmissivity areas B occur because the liquid crystal molecules above auxiliary pixel electrodes PEb1 and PEb2 having large widths wb1 and wb2 are scarcely switched. The low transmissivity areas B will occur inside the aperture AP shown in FIG. 2, and thus, may affect the display quality.

In the measurement result of FIG. 14, there were also recognized low transmissivity areas B; however, the size thereof is relatively small as compared to those seen in FIG. 13 and they do not reach the main pixel electrode PEa. Therefore, the pixel electrode PE of the first variation can reduce the size of the low transmissivity area B in the proximity of each of auxiliary pixel electrodes PEb1 and PEb2 and the influence thereof can be suppressed. The transmissivity of the pixel PX can be improved by the first variation.

In addition, the pixel electrode PE of the first variation can achieve the same advantage as in the above embodiment.

(Second Variation)

FIG. 15 is a plan view which shows a pixel electrode PE of the second variation as being viewed from the counter substrate CT side. The pixel electrode PE of the second variation corresponds to that in a pixel PX in first line L1 of FIG. 4, for example. Comparing the pixel electrode PE of the second variation with that of FIG. 5, the second variation shows that the end of the second auxiliary pixel electrode PEb2 connects with the one end of the main pixel electrode PEa (the end at the third part PEa3 side). The pixel electrode PE of the second variation differs from that of FIG. 5 in this respect. That is, the second auxiliary pixel electrode PEb2 and the third part PEa3 form substantially an L-shape.

If the pixel electrodes PE in FIG. 4 are replaced with the pixel electrodes PE of the second variation, the pixel electrode PE of the pixel PX in second line L2 and the pixel electrode PE of the pixel PX in first line L1 (as in FIG. 15) are shaped symmetrically with respect to direction Y.

The pixel electrode PE of the second variation can achieve substantially the same advantages as in the above embodiment. Furthermore, in the pixel PX formed by the pixel electrode PE of the second variation, the aforementioned low transmissivity area B at the proximity of the second auxiliary pixel electrode PEb2 can be reduced and the influence caused thereby can be suppressed.

(Third Variation)

FIG. 16 is a plan view which shows a pixel electrode PE of the third variation as being viewed from the counter substrate CT side. The pixel electrode PE of the third variation corresponds to that in a pixel PX in first line L1 of FIG. 4, for example. Comparing the pixel electrode PE of the third variation with that of FIG. 5, the third variation shows that the main pixel electrode PEa includes a first part PEa1 but a second part PEa2 or a third part PEa3. Furthermore, the third variation shows that the end of the first auxiliary pixel electrode PEb1 connects with the end of the main pixel electrode PEa (one end of the first part PEa1) and the end of the second auxiliary pixel electrode PEb2 connects with the other end of the main pixel electrode PEa (the other end of the first part PEa1). The pixel electrode PE of the third variation differs from that of FIG. 5 in these respects. That is, the first auxiliary pixel electrode PEb1 and the first part PEa1, and the second auxiliary pixel electrode PEb2 and the first part PEa1 form substantially an L-shape, respectively.

If the pixel electrodes PE in FIG. 4 are replaced with the pixel electrodes PE of the third variation, the pixel electrode PE of the pixel PX in second line L2 and the pixel electrode PE of the pixel PX in first line L1 (as in FIG. 16) are shaped symmetrically with respect to direction Y.

The pixel electrode PE of the third variation can achieve substantially the same advantages as in the above embodiment although the disclination prevention effect is relatively weak. Furthermore, in the pixel PX formed by the pixel electrode PE of the third variation, the aforementioned low transmissivity area B at the proximity of each of the first and second auxiliary pixel electrodes PEb1 and PEb2 can be reduced and the influence caused thereby can be suppressed.

(Fourth Variation)

FIG. 17 is a plan view which shows a pixel electrode PE of the fourth variation as being viewed from the counter substrate CT side. The pixel electrode PE of the fourth variation corresponds to that in a pixel PX in first line L1 of FIG. 4, for example. Comparing the pixel electrode PE of the fourth variation with that of FIG. 5, the fourth variation shows that length db2 of the second auxiliary pixel electrode PEb2 in direction Y is less than length db1 of the first auxiliary pixel electrode PEb1 in direction Y. The pixel electrode PE of the fourth variation differs from that of FIG. 5 in this respect.

If the pixel electrodes PE in FIG. 4 are replaced with the pixel electrodes PE of the fourth variation, the pixel electrode PE of the pixel PX in second line L2 and the pixel electrode PE of the pixel PX in first line L1 (as in FIG. 17) are shaped symmetrically with respect to direction Y.

The pixel electrode PE of the fourth variation can achieve substantially the same advantages as in the above embodiment. Furthermore, in the pixel PX formed by the pixel electrode PE of the fourth variation, the area of the second auxiliary pixel electrode PEb2 is small, and thus, the aforementioned low transmissivity area B at the proximity of the second auxiliary pixel electrode PEb2 can be reduced and the influence caused thereby can be suppressed.

(Fifth Variation)

FIG. 18 is a plan view which shows a pixel electrode PE of the fifth variation as being viewed from the counter substrate CT side. The pixel electrode PE of the fifth variation corresponds to that in a pixel PX in first line L1 of FIG. 4, for example. Comparing the pixel electrode PE of the fifth variation with that of FIG. 5, the fifth variation shows that the main pixel electrode PEa is formed straight having a first part PEa1 but not having a second part PEa2 or a third part PEa3, and that length db2 of the second auxiliary pixel electrode PEb2 in direction Y is less than length db1 of the first auxiliary pixel electrode PEb1 in direction Y. The pixel electrode PE of the fifth variation differs from that of FIG. 5 in these respects. Furthermore, the third variation shows that the end of the first auxiliary pixel electrode PEb1 connects with the end of the main pixel electrode PEa (one end of the first part PEa1) and the end of the second auxiliary pixel electrode PEb2 connects with the other end of the main pixel electrode PEa (the other end of the first part PEa1). That is, the first auxiliary pixel electrode PEb1 and the first part PEa1, and the second auxiliary pixel electrode PEb2 and the first part PEa1 form substantially an L-shape, respectively.

If the pixel electrodes PE in FIG. 4 are replaced with the pixel electrodes PE of the fifth variation, the pixel electrode PE of the pixel PX in second line L2 and the pixel electrode PE of the pixel PX in first line L1 (as in FIG. 18) are shaped symmetrically with respect to direction Y.

The pixel electrode PE of the fifth variation can achieve substantially the same advantages as in the above embodiment although the disclination prevention effect is relatively weak. Furthermore, in the pixel PX formed by the pixel electrode PE of the third variation, the aforementioned low transmissivity area B at the proximity of each of the first and second auxiliary pixel electrodes PEb1 and PEb2 can be reduced and the influence caused thereby can be suppressed. Especially, the area of the second auxiliary pixel electrode PEb2 is small, and thus, the aforementioned low transmissivity area B at the proximity of the second auxiliary pixel electrodes PEb2 can be reduced significantly.

(Sixth Variation)

FIG. 19 is a plan view which shows a pixel electrode PE of the sixth variation as being viewed from the counter substrate CT side. The pixel electrode PE of the sixth variation corresponds to that in a pixel PX in first line L1 of FIG. 4, for example. Comparing the pixel electrode PE of the sixth variation with that of FIG. 5, the sixth variation shows that the main pixel electrode PEa includes a first part PEa1 and a second part PEa2 but a third part PEa3. The pixel electrode PE of the sixth variation differs from that of FIG. 5 in this respect.

If the pixel electrodes PE in FIG. 4 are replaced with the pixel electrodes PE of the sixth variation, the pixel electrode PE of the pixel PX in second line L2 and the pixel electrode PE of the pixel PX in first line L1 (as in FIG. 19) are shaped symmetrically with respect to direction Y.

With the main pixel electrode PEa bent as in the pixel electrode PE of the sixth variation, the aforementioned disclination can be reduced or prevented. In addition, the pixel electrode of the sixth variation can achieve the same advantage as in the above embodiment.

(Seventh Variation)

FIG. 20 is a plan view which shows a pixel electrode PE of the seventh variation as being viewed from the counter substrate CT side. The pixel electrode PE of the seventh variation corresponds to that in a pixel PX in first line L1 of FIG. 4, for example. Comparing the pixel electrode PE of the seventh variation with that of FIG. 5, the seventh variation shows that the main pixel electrode PEa does not include a third part PEa3, and that the end of the first auxiliary pixel electrode PEb1 connects with one end of the main pixel electrode PEa (the end at the second part PEa2 side) and the end of the second auxiliary pixel electrode PEb2 connects with the other end of the main pixel electrode PEa (the end at the first part PEa1 side). The pixel electrode PF of the seventh variation differs from that of FIG. 5 in these respects. That is, the first auxiliary pixel electrode PEb1 and the second part PEa2, and the second auxiliary pixel electrode PEb2 and the first part PEa1 form substantially an L-shape, respectively.

If the pixel electrodes PE in FIG. 4 are replaced with the pixel electrodes PE of the seventh variation, the pixel electrode PE of the pixel PX in second line L2 and the pixel electrode PE of the pixel PX in first line L1 (as in FIG. 20) are shaped symmetrically with respect to direction Y.

With the main pixel electrode PEa bent as in the pixel electrode PE of the seventh variation, the aforementioned disclination can be reduced or prevented as in the above embodiment. In addition, the pixel electrode of the sixth variation can achieve substantially the same advantages as in the above embodiment. Furthermore, in the pixel PX formed by the pixel electrode PE of the seventh variation, the aforementioned low transmissivity area B at the proximity of each of the first and second auxiliary pixel electrodes PEb1 and PEb2 can be reduced and the influence caused thereby can be suppressed.

(Eighth Variation)

FIG. 21 is a plan view which shows a pixel electrode PE of the eighth variation as being viewed from the counter substrate CT side. The pixel electrode PE of the eighth variation corresponds to that in a pixel PX in first line L1 of FIG. 4, for example. Comparing the pixel electrode PE of the eighth variation with that of FIG. 5, the eighth variation shows that the main pixel electrode PEa does not include a third part PEa3 and that the end of the second auxiliary pixel electrode PEb2 connects with the end of the main pixel electrode PEa (the end at the first part PEa1 side). The pixel electrode PE of the eighth variation differs from that of FIG. 5 in these respects. That is, the second auxiliary pixel electrode PEb2 and the first part PEa1 form substantially an L-shape.

If the pixel electrodes PE in FIG. 4 are replaced with the pixel electrodes PE of the eighth variation, the pixel electrode PE of the pixel PX in second line L2 and the pixel electrode PE of the pixel PX in first line L1 (as in FIG. 21) are shaped symmetrically with respect to direction Y.

With the main pixel electrode PEa bent as in the pixel electrode PE of the eighth variation, the aforementioned disclination can be reduced or prevented as in the above embodiment. In addition, the pixel electrode of the eighth variation can achieve substantially the same advantages as in the above embodiment. Furthermore, in the pixel PX formed by the pixel electrode PE of the eighth variation, the aforementioned low transmissivity area B at the proximity of the second auxiliary pixel electrodes PEb2 can be reduced and the influence caused thereby can be suppressed.

(Ninth Variation)

FIG. 22 is a plan view which shows a pixel electrode PE of the ninth variation as being viewed from the counter substrate CT side. The pixel electrode PE of the ninth variation corresponds to that in a pixel PX in first line L1 of FIG. 4, for example. Comparing the pixel electrode PE of the ninth variation with that of FIG. 5, the ninth variation shows that the width of the second part PEa2 increases as approaching the first auxiliary pixel electrode PEb1 and the width of the third part PEa3 increases as approaching the second auxiliary pixel electrode PEb2. The pixel electrode PE of the ninth variation differs from that of FIG. 5 in this respect.

Specifically, in FIG. 22, the right edge of the second part PEa2 extends at angle θ2 counterclockwise in direction X while the left edge of the second part PEa2 extends at angle θ1 counterclockwise in direction X. Furthermore, in FIG. 22, the left edge of the third part PEa3 extends at angle θ3 counterclockwise in direction X while the right edge of the third part PEa3 extends at angle θ1 counterclockwise in direction X.

The width wa of the first part PEa1 is constant over its entire length and extends at angle θ1 counterclockwise in direction X. The right and left edges of the first part PEa1 are connected with the right and left edges of the second part PEa2 and the third part PEa3, respectively. That is, the left edge of the first part PEa1 and the left edge of the second part PEa2 extend in a single straight line. Furthermore, the right edge of the first part PEa1 and the right edge of the third part PEa3 extend in a single straight line.

If the pixel electrodes PE in FIG. 4 are replaced with the pixel electrodes PE of the ninth variation, the pixel electrode PE of the pixel PX in second line L2 and the pixel electrode PE of the pixel PX in first line L1 (as in FIG. 22) are shaped symmetrically with respect to direction Y.

The pixel electrode of the ninth variation can achieve substantially the same advantages as in the above embodiment.

(Tenth Variation)

FIG. 23 is a plan view which shows a pixel electrode PE of the tenth variation as being viewed from the counter substrate CT side. The pixel electrode PE of the tenth variation corresponds to that in a pixel PX in first line L1 of FIG. 4, for example. Comparing the pixel electrode PE of the tenth variation with that of FIG. 5, the tenth variation shows that the end of the first auxiliary pixel electrode PEb1 connects with one end of the main pixel electrode PEa (the end at the second part PEa2 side) and the end of the second auxiliary pixel electrode PEb2 connects with the other end of the main pixel electrode PEa (the end at the third part PEa3 side). The pixel electrode PF of the tenth variation differs from that of FIG. 5 in these respects.

Furthermore, the tenth variation shows that the width of the second part PEa2 increases as approaching the first auxiliary pixel electrode PEb1 and the width of the third part PEa3 increases as approaching the second auxiliary pixel electrode PEb2. The pixel electrode PE of the tenth variation differs from that of FIG. 5 in this respect, too. Specifically, in FIG. 23, the right edge of the second part PEa2 extends at angle θ2 counterclockwise in direction X while the left edge of the second part PEa2 extends at angle θ1 counterclockwise in direction X. Furthermore, in FIG. 23, the left edge of the third part PEa3 extends at angle θ3 counterclockwise in direction X while the right edge of the third part PEa3 extends at angle θ1 counterclockwise in direction X.

The width wa of the first part PEa1 is constant over its entire length and extends at angle θ1 counterclockwise in direction X. The right and left edges of the first part PEa1 are connected with the right and left edges of the second part PEa2 and the third part PEa3, respectively. That is, the left edge of the first part PEa1 and the left edge of the second part PEa2 extend in a single straight line. Furthermore, the right edge of the first part PEa1 and the right edge of the third part PEa3 extend in a single straight line.

If the pixel electrodes PE in FIG. 4 are replaced with the pixel electrodes PE of the tenth variation, the pixel electrode PE of the pixel PX in second line L2 and the pixel electrode PE of the pixel PX in first line L1 (as in FIG. 23) are shaped symmetrically with respect to direction Y.

The pixel electrode of the tenth variation can achieve substantially the same advantages as in the above embodiment. Furthermore, in the pixel PX formed by the pixel electrode PE of the tenth variation, the aforementioned low transmissivity area B at the proximity of each of the first and second auxiliary pixel electrodes PEb1 and PEb2 can be reduced and the influence caused thereby can be suppressed.

(Eleventh Variation)

FIG. 24 is a plan view which shows a pixel electrode PE of the eleventh variation as being viewed from the counter substrate CT side. The pixel electrode PE of the tenth variation corresponds to that in a pixel PX in first line L1 of FIG. 4, for example. Comparing the pixel electrode PE of the eleventh variation with that of FIG. 5, the eleventh variation shows that the end of the second auxiliary pixel electrode PEb2 connects with the end of the main pixel electrode PEa (the end at the third part PEa3 side).

Furthermore, the eleventh variation shows that the width of the second part PEa2 increases as approaching the first auxiliary pixel electrode PEb1 and the width of the third part PEa3 increases as approaching the second auxiliary pixel electrode PEb2. The pixel electrode PE of the eleventh variation differs from that of FIG. 5 in this respect, too. Specifically, in FIG. 24, the right edge of the second part PEa2 extends at angle θ2 counterclockwise in direction X while the left edge of the second part PEa2 extends at angle θ1 counterclockwise in direction X. Furthermore, in FIG. 24, the left edge of the third part PEa3 extends at angle θ3 counterclockwise in direction X while the right edge of the third part PEa3 extends at angle θ1 counterclockwise in direction X.

The width wa of the first part PEa1 is constant over its entire length and extends at angle θ1 counterclockwise in direction X. The right and left edges of the first part PEa1 are connected with the right and left edges of the second part PEa2 and the third part PEa3, respectively. That is, the left edge of the first part PEa1 and the left edge of the second part PEa2 extend in a single straight line. Furthermore, the right edge of the first part PEa1 and the right edge of the third part PEa3 extend in a single straight line.

If the pixel electrodes PE in FIG. 4 are replaced with the pixel electrodes PE of the eleventh variation, the pixel electrode PE of the pixel PX in second line L2 and the pixel electrode PE of the pixel PX in first line L1 (as in FIG. 24) are shaped symmetrically with respect to direction Y.

The pixel electrode of the eleventh variation can achieve substantially the same advantages as in the above embodiment. Furthermore, in the pixel PX formed by the pixel electrode PE of the eleventh variation, the aforementioned low transmissivity area B at the proximity of the second auxiliary pixel electrode PEb2 can be reduced and the influence caused thereby can be suppressed.

Various forms can be adopted as the pixel electrode PE other than the above exemplified variations. Furthermore, if the pixel electrode PE is transformed into the above variations or any other forms, the source lines S defining the pixel PX may be bent into a form parallel to the main pixel electrode PEa. Furthermore, in the above embodiment and variations, pixel electrodes PE are arranged symmetrically with respect to direction Y in each pair of lines defined by the source lines S; however, the pixel electrode PE arranged in the each line may be formed in the same shape.

In the embodiments described above, each of pixels includes only a main pixel electrode, but it is not limited to the structure. The pixel electrode of each pixel may include at least two main pixel electrodes. The effects explained above, for instance the effects regarding the angle of main electrode and the effects explained with FIG. 13 and FIG. 14, are also obtained by such structure.

All design changes conceived of by a skilled person based on the structures described above as the embodiment of the present invention and variations thereof are, as long as they fall within the scope and spirit of the present invention, naturally encompassed by the scope of the present invention.

Furthermore, regarding the present embodiment, any advantage and effect those will be obvious from the description of the specification or arbitrarily conceived by a skilled person are considered naturally achievable by the present invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   a first substrate comprising a first gate line, a second gate line, a first insulating film covering the first and second gate lines, a first source line and a second source line on the first insulating film, a first switching element electrically connected with the first gate line and the first source line, a second switching element electrically connected with the second gate line and the first source line, a second insulating film covering the first and second source lines and the first and second switching elements, a common electrode on the second insulating film, a third insulating film covering the common electrode, a pixel electrode on the third insulating film electrically connected with the first switching element, and a first alignment film in contact with the pixel electrode;
   a second substrate comprising a second alignment film; and
   a liquid crystal layer comprising liquid crystal molecules held between the first alignment film and the second alignment film, wherein
   the pixel electrode comprises a single main pixel electrode, a first auxiliary pixel electrode, and a second auxiliary pixel electrode, the single main pixel electrode extends in a belt shape in a pixel area defined by the first and second gate lines and the first and second source lines, and extends in a direction of extension of the first source line and in parallel to the first source line,
   the single main pixel electrode comprises a first part slanting at a first angle with respect to a direction of extension of the first gate line and extending in a belt shape, and a second part and a third part connected with first ends of the first part, respectively, and each second and third part slanting at a second angle which is less than the first angle with respect to the direction of extension of the first gate line while extending in a belt shape,
   the single main pixel electrode is connected to the first auxiliary pixel electrode only by a second end of the second part connected with a middle part of the first auxiliary pixel electrode in the direction of the extension of the first gate line,
   the single main pixel electrode is connected to the second auxiliary pixel electrode only by a second end of the third part connected with a middle part of the second auxiliary pixel electrode in the direction of the extension of the first gate line,
   the common electrode is formed substantially on an entirety of the pixel area, and opposed to the single main pixel electrode,
   the pixel electrode is formed of a transparent conductive material, and does not include a slit,
   the first switching element includes a first semiconductor layer,
   the second switching element includes a second semiconductor layer,
   the first auxiliary pixel electrode overlaps a part of the first semiconductor layer, and
   the second auxiliary pixel electrode overlaps a part of the second semiconductor layer.

2. The liquid crystal display device of claim 1, wherein the third part of the single main pixel electrode overlaps a part of the second semiconductor layer.

3. The liquid crystal display device of claim 2, wherein the first auxiliary pixel electrode overlaps a part of the first gate line,
   the second auxiliary pixel electrode overlaps a part of the second gate line, and
   an area in which the first auxiliary pixel electrode and the first gate line overlap each other is smaller than an area in which the second auxiliary pixel electrode and the second gate line overlap each other.

4. The liquid crystal display device of claim 1, wherein the pixel area includes:
   a first area surrounded by the single main pixel electrode, the first source line, the first auxiliary pixel electrode, and the second auxiliary pixel electrode, and
   a second area surrounded by the single main pixel electrode, the second source line, the first auxiliary pixel electrode, and the second auxiliary pixel electrode, and
   the common electrode is seamlessly formed in the first and second areas.

5. The liquid crystal display device of claim 2, wherein the first angle is between 75° and 87° inclusive and the second angle is between 45° and 75° inclusive.

6. The liquid crystal display device of claim 2, wherein the first auxiliary pixel electrode has a width greater than the main pixel electrode in the direction of extension of the first gate line.

7. The liquid crystal display device of claim 6, wherein a width of the single main pixel electrode in the direction of extension of the first gate line and a pitch between a plurality of pixel electrodes arranged in the direction of extension of the first gate line satisfy the following:

the pitch×0.5−4.5 μm≤the width of the single main pixel electrode.

8. The liquid crystal display device of claim 6, wherein a width of the single main pixel electrode in the direction of extension of the first gate line and a pitch between a plurality of pixel electrodes arranged in the direction of extension of the first gate line satisfy the following:

the width of the single main pixel electrode≤the pitch−9 μm.

9. A liquid crystal display device comprising:
a first substrate comprising a first gate line, a second gate line, a first insulating film covering the first and second gate lines, a first source line and a second source line on the first insulating film, a first switching element electrically connected with the first gate line and the first source line, a second switching element electrically connected with the second gate line and the first source line, a second insulating film covering the first and second source lines and the first and second switching elements, a common electrode on the second insulating film, a third insulating film covering the common electrode, a pixel electrode on the third insulating film electrically connected with the first switching element, and a first alignment film in contact with the pixel electrode;
a second substrate comprising a second alignment film; and
a liquid crystal layer comprising liquid crystal molecules held between the first alignment film and the second alignment film, wherein
the pixel electrode comprises a first auxiliary pixel electrode, a second auxiliary pixel electrode, and a single main pixel electrode having a first edge and a second edge and extending in a pixel area defined by the first and second gate lines and the first and second source lines, the single main pixel electrode extending in a direction of extension of the first source line and in parallel to the first source line,
the single main pixel electrode does not include any other edge between the first edge and the second edge, and
the single main pixel electrode comprises a first part slanting at a first angle with respect to a direction of extension of the first gate line and extending in a belt shape, and a second part and a third part connected with first ends of the first part, respectively, and each second and third part slanting at a second angle which is less than the first angle with respect to the direction of extension of the first gate line while extending in a belt shape,
the single main pixel electrode is connected to the first auxiliary pixel electrode only by a second end of the second part connected with a middle part of the first auxiliary pixel electrode in the direction of the extension of the first gate line,
the single main pixel electrode is connected to the second auxiliary pixel electrode only by a second end of the third part connected with a middle part of the second auxiliary pixel electrode in the direction of the extension of the first gate line,
the common electrode is formed substantially on an entirety of the pixel area, and opposed to the single main pixel electrode,
the pixel electrode is formed of a transparent conductive material, and does not include a slit,
the first switching element includes a first semiconductor layer,
the second switching element includes a second semiconductor layer,
the first auxiliary pixel electrode overlaps a part of the first semiconductor layer, and
the second auxiliary pixel electrode overlaps a part of the second semiconductor layer.

10. The liquid crystal display device of claim 9, wherein the third part of the single main pixel electrode overlaps a part of the second semiconductor layer.

11. The liquid crystal display device of claim 10, wherein the first auxiliary pixel electrode overlaps a part of the first gate line,
the second auxiliary pixel electrode overlaps a part of the second gate line, and
an area in which the first auxiliary pixel electrode and the first gate line overlap each other is smaller than an area in which the second auxiliary pixel electrode and the second gate line overlap each other.

12. The liquid crystal display device of claim 9, wherein the pixel area includes:
a first area surrounded by the single main pixel electrode, the first source line, the first auxiliary pixel electrode, and the second auxiliary pixel electrode; and
a second area surrounded by the single main pixel electrode, the second source line, the first auxiliary pixel electrode, and the second auxiliary pixel electrode, and
the common electrode is seamlessly formed in the first and second areas.

13. The liquid crystal display device of claim 10, wherein the first angle is between 75° and 87° inclusive and the second angle is between 45° and 75° inclusive.

14. The liquid crystal display device of claim 10, wherein the first auxiliary pixel electrode has a width greater than the main pixel electrode in the direction of extension of the first gate line.

15. The liquid crystal display device of claim 14, wherein a width of the single main pixel electrode in the direction of extension of the first gate line and a pitch between a plurality of pixel electrodes arranged in the direction of extension of the first gate line satisfy the following:

the pitch×0.5−4.5 μm≤the width of the single main pixel electrode.

16. The liquid crystal display device of claim 14, wherein a width of the single main pixel electrode in the direction of extension of the first gate line and a pitch between a plurality of pixel electrodes arranged in the direction of extension of the first gate line satisfy the following:

the width of the single main pixel electrode≤the pitch−9 μm.

* * * * *